United States Patent [19]

Nagasawa

[11] Patent Number: 5,799,530
[45] Date of Patent: Sep. 1, 1998

[54] METHOD OF BENDING OPERATIONS AND BENDING SYSTEM USING THE SAME

[75] Inventor: Tadahiko Nagasawa, Kanagawa, Japan

[73] Assignee: Amada Company, Limited, Kanagawa, Japan

[21] Appl. No.: 771,308

[22] Filed: Dec. 20, 1996

[51] Int. Cl.$^6$ ............................. B21D 5/04; B21J 13/10; B21C 37/02
[52] U.S. Cl. ............... 72/389.3; 72/379.2; 72/14.8; 72/420; 72/461
[58] Field of Search ............... 72/389.1, 389.3, 72/14.8, 379.2, 461, 420

[56] References Cited

U.S. PATENT DOCUMENTS

| 4,831,862 | 5/1989 | Ohashi et al. | 72/389.3 |
| 5,005,394 | 4/1991 | Sartorio et al. | 72/389.3 |
| 5,029,462 | 7/1991 | Wakahara et al. | 72/389.3 |

FOREIGN PATENT DOCUMENTS

| 63-36925 | 2/1988 | Japan | 72/389.3 |
| 63-154217 | 6/1988 | Japan | 72/389.3 |
| 63-154219 | 6/1988 | Japan | 72/389.3 |
| 63-154220 | 6/1988 | Japan | 72/389.3 |
| 63-154230 | 6/1988 | Japan | 72/389.3 |
| 5127587 | 5/1993 | Japan . | |
| 5216525 | 8/1993 | Japan . | |
| 7121418 | 12/1995 | Japan . | |

OTHER PUBLICATIONS

English Language Translation of JP-7-121418.
English Language Translation of JP-5-216525.
English Language Translation of JP-5-127587.

Primary Examiner—David Jones
Attorney, Agent, or Firm—Greenblum & Bernstein P.L.C.

[57] ABSTRACT

Object of the present invention is to provide a method or a system by which an operator without skills in bending operation can easily and quickly perform precise bending operations on a sheet workpiece by following skilled operator's experience, hints or data. To achieve this object, the method of this present invention comprises the steps of storing data for a shape of said part; storing data for a bending order for manufacturing said part from said workpiece; selecting tools for performing each of bending operations; storing data for the selected dies; storing bending press control data for controlling the operation of said press to performs the bending operations in said bending order; and storing bending operation support information for supporting an operator for performing the bending operation by using said bending press. The bending operation support information includes at least one of hints regarding operations of attaching a protective tape on the shoulder of a die; arranging small tools on the bending press so that punch and die are laterally shifted from each other; attaching small die on a ram with a fixing tape; aligning the punch and die relative to each other in a longitudinal direction; determining the original point of one of the punch and die relative to the other; positioning the workpiece relative to the punch and die; positioning the workpiece relative to a back gauge device; and checking a dimension of a shape of the workpiece after a bending operation.

21 Claims, 16 Drawing Sheets

| BENDING ORDER | BENDING LINE | TOOL NUMBER | | TOOL LENGTH |
|---|---|---|---|---|
| 1 | $B_3$ | $P=P_1$ | | 835 |
| | | $D=D_1$ | | 835 |
| 2 | $B_2$ | $P=P_1$ | | 835 |
| | | $D=D_1$ | | 835 |
| 3 | $B_1$ | $P=P_2$ | | 50 |
| | | $D=D_2$ | | 50 |

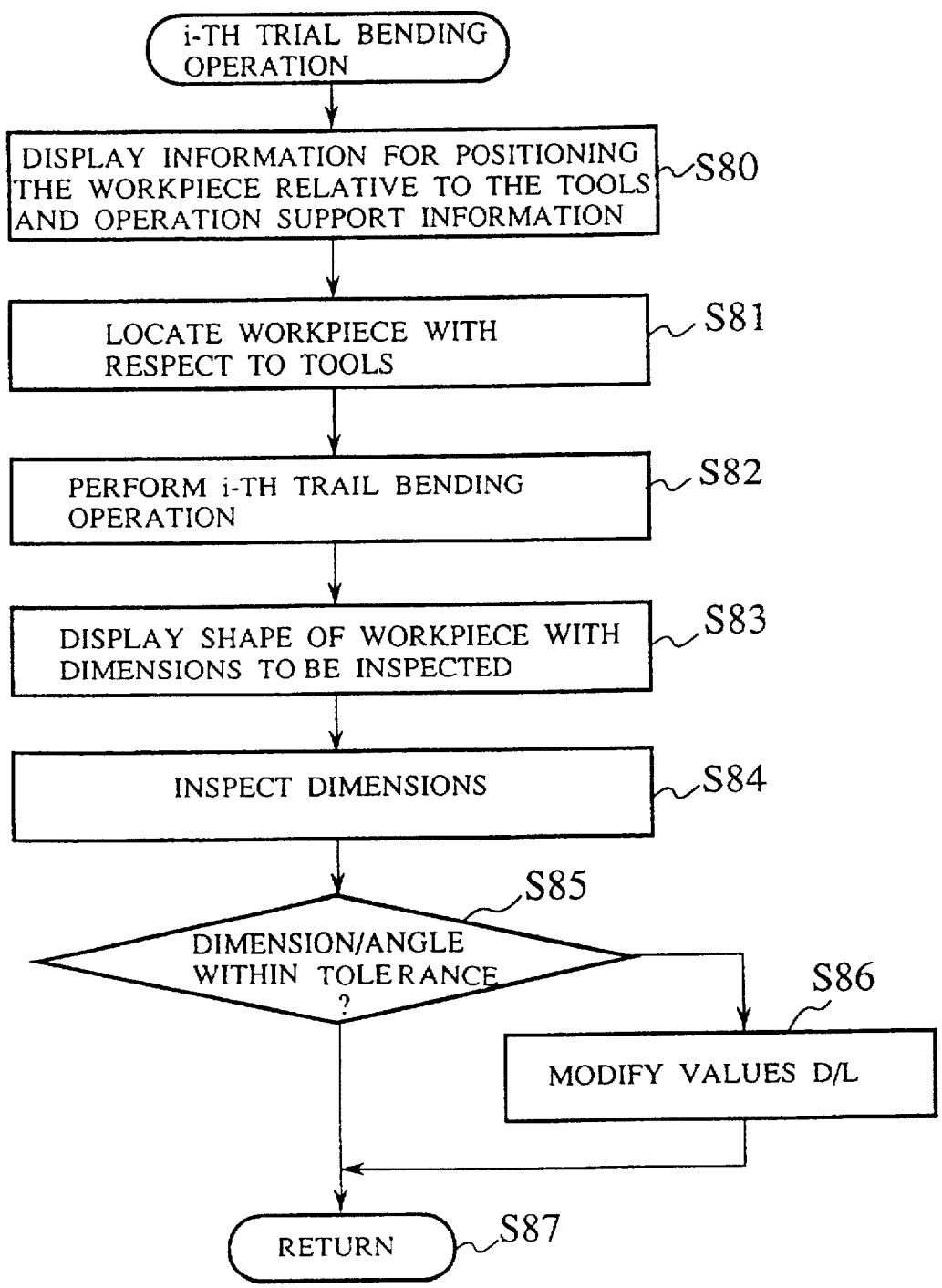

1

METHOD OF BENDING OPERATIONS AND BENDING SYSTEM USING THE SAME

BACKGROUND OF THE INVENTION

1. Field of the Invention

The present invention relates to a method of bending operations and a bending system using the same, and more particularly to a method of bending operations in a plate material such as sheet metal by using a bending press such as a press brake, and a bending system using that method.

2. Prior Art

When various parts or products with complicated shapes are manufactured by performing one or more bending operations, various preparation steps have to be carried out before performing the actual bending operations are performed. Examples of such preparation steps are as follows: determining the order of bending operations along bending lines; arranging bending tools on a bending press; and adjusting the positions of the bending tools in the bending press. In fact, conventionally, enormous working hours has been wasted to carry out these preparation steps. Further, when a bending operation for manufacturing a specific product has been finished, the data concerning the preparation steps has been thrown away. Thus, even when products that are the same as or similar to the previous product are manufactured later, the preparation steps had to be carried out again.

SUMMARY OF THE INVENTION

The object of the present invention is to solve the foregoing problems of the conventional method and system.

Specifically, the object of the present invention is to provide a method and a system for bending operation in which various data concerning preparation steps for a particular bending operation are suitably stored in a memory so that they can be used in a subsequent bending operations for manufacturing parts having the same shape or similar shapes.

Another object of the present invention is to provide a method or a system by which an operator without skills in performing bending operations can easily and quickly perform precise bending operations on a workpiece by following skilled operator's experience, hints, or data.

To achieve the foregoing objects, according to a first aspect of the present invention, there is provided a method of generating data for manufacturing a product or a part with a predetermined shape by using a bending press that is provided with a detachable die. The method comprises the steps of:

entering shape data relating to the part or product;

entering a bending order for manufacturing the part or product from the workpiece;

selecting tools for performing the bending operations in the bending order;

entering die data for specifying the selected tools;

entering bending press control data for controlling the operation of the press for performing each bending operation which is performed in the bending order; and entering bending operation support information for supporting an operator for performing the bending operation.

The bending operation support information includes at least one of the following hints or information regarding the operations of:

attaching a protective tape on the shoulder of a die;

2 arranging small tools on the bending press so that punch and die are laterally shifted from each other;

attaching a small die on a ram with a fixing tape;

aligning the punch and die relative to each other in a longitudinal direction;

determining the original point of one of the punch and die relative to the other;

positioning the workpiece relative to the punch and die;

positioning the workpiece relative to a back gauge device; and inspecting dimensions of a shape of the workpiece after a bending operation.

According to a second aspect of the present invention, there is provided another method of manufacturing a part or a product with a predetermined shape by using a bending press that has a detachable die. This method comprises the steps of:

entering shape data relating to the part or the product;

entering a bending order for manufacturing the part or the product from the sheet metal:

selecting tools for performing each of bending operations to be performed in the bending order;

entering die data for specifying the selected tools;

mounting the selected die on the bending press;

entering bending press control data for controlling the operation of the bending press for performing each of the bending operations to be performed in the bending order;

bending the sheet metal in accordance with bending press control data for each of the bending operations; and entering bending operation support information for supporting an operator who is to perform bending operations to manufacture a part or a product that has the same shape as or a shape similar to the part or the product produced in the foregoing bending step.

According to a third aspect of the present invention, there is provided a still another method of manufacturing a part or a product having a predetermined shape by bending a sheet metal by a bending press. This method comprises the steps of:

determining a bending order and tools for use to manufacture the part or the product in accordance with the shape thereof;

storing the determined bending order and the tools in a computer memory;

selecting the determined tools from a die storage;

determining arrangement of the tools on the bending press;

storing the determined arrangement of the tools in the computer memory;

mounting the tools on a bending machine with the determined arrangement;

determining an attitude of insertion of the sheet metal into the bending press in each of the bending steps to be performed in the bending order;

storing the determined attitude of insertion of the determined sheet if metal for each of the bending steps; and inserting the sheet metal with the insertion attitude into the bending press for each of the bending steps and bending the sheet metal along predetermined bending lines on the sheet metal by the bending press.

According to a fourth aspect of the present invention, there is provided a system for generating data for manufacturing a part by bending a workpiece along a plurality of bending lines by a bending press that has detachable tools. The system comprises:

a section that stores data for a shape of the part;

a section that stores data for a bending order for manufacturing the part from the workpiece;

a section that stores data for specifying the selected dies for each bending operation;

a section that stores bending press control data for controlling the operation of the press to performs the bending operations in the bending order; and a section that stores bending operation support information for supporting an operator for performing the bending operation by using the bending press.

In accordance with the present invention, various optimum steps (or procedures) relating to the bending operations, which are carried out by a skilled operator for manufacturing a predetermined part or a product, are stored in a computer memory as operation information for each part. Therefore a non-skilled operator can learn, from the computer memory, the stored optimum operation information for each part or product later and easily and quickly perform the optimum steps (or procedures) for manufacturing the part or the product by following the skilled operator. That is, even a non skilled operator can quickly start the bending operation without taking an excessively long time for standby operations (or preparation steps) for manufacturing the part or product.

The term "part" in this specification means a product that is to be distributed in a market as well as a portion of the product.

BRIEF DESCRIPTION OF THE DRAWINGS

FIG. 12B is a flow chart showing a detailed operation of a portion of the operation shown in flow chart of FIG. 12A, and specifically the flow chart showing the operation for performing an i-th trial bending operation on a sheet metal in FIG. 12A;

DESCRIPTION OF THE PREFERRED EMBODIMENTS

Examples of the present invention will now be described with reference to the drawings.

Figure 1:
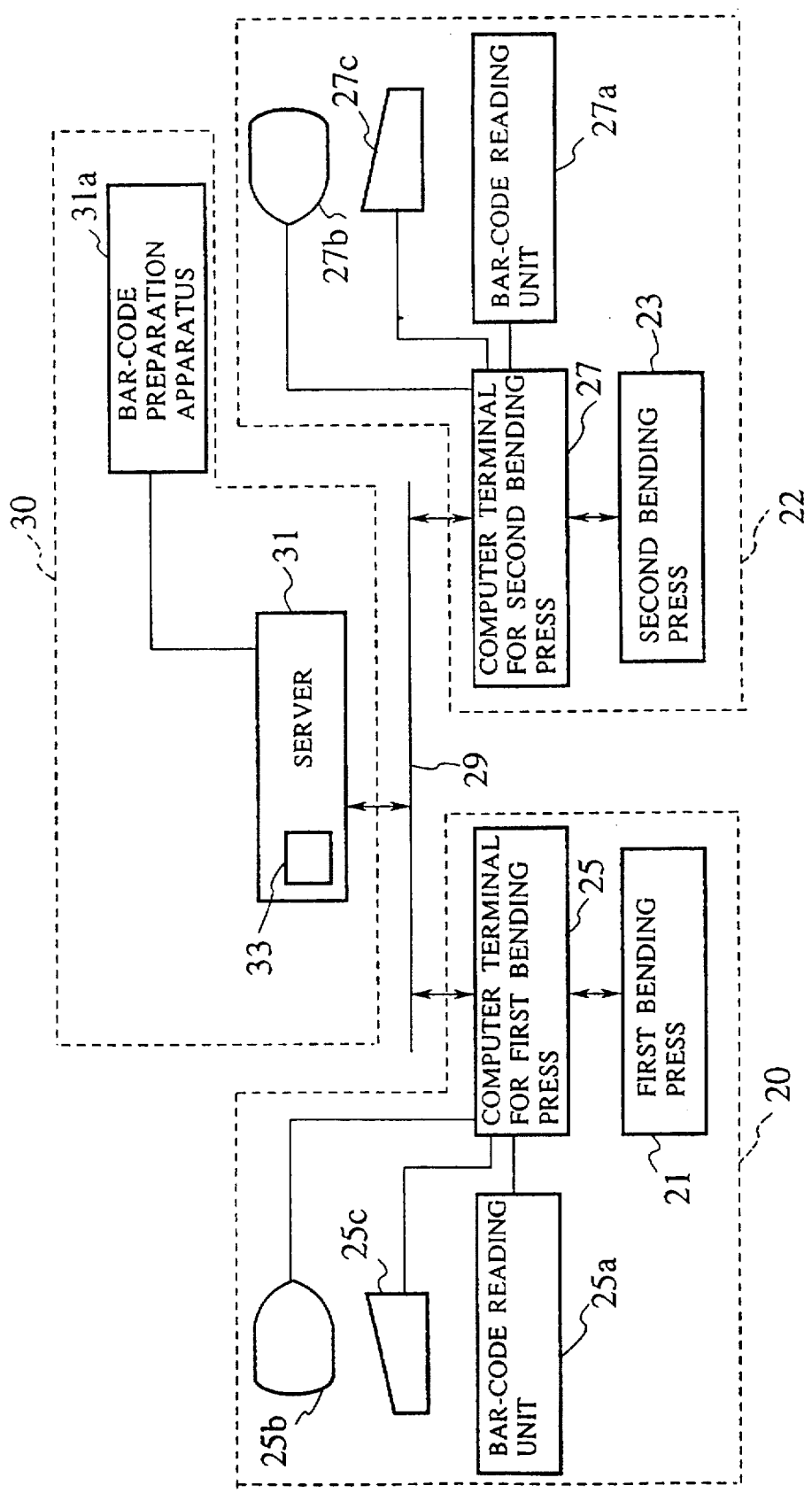
FIG. 1 is a block diagram of an embodiment of a plate bending system according to the present invention.

FIG. 1 is a block diagram of a plate bending system according to the present invention. As shown in FIG. 1, the plate bending system according to this embodiment includes a factory office 30 for receiving from a customer an order for manufacturing a part or a product (a bent workpiece) with a predetermined shape and a plurality of bending stations 20 and 22 with bending presses. The bending stations receive from the factory office 30 instructions to manufacture the ordered part or product.

The factory office 30 is provided with a server computer (hereinafter called a "server") 31 having a database 33. The database 33 in the server 31 stores a variety of data about parts which have been manufactured by the bending system, as will be described later in detail. A bar-code preparation apparatus 31a for preparing bar codes is connected to the server 31.

The first bending station 20 of the bending stations 20 and 22 has a first bending press 21 such as a press brake and a first computer terminal 25 (hereinafter called a "terminal for a press" or simply called a "terminal"). The terminal 25 includes an NC unit for controlling the first bending press 21.

Figure 13A:
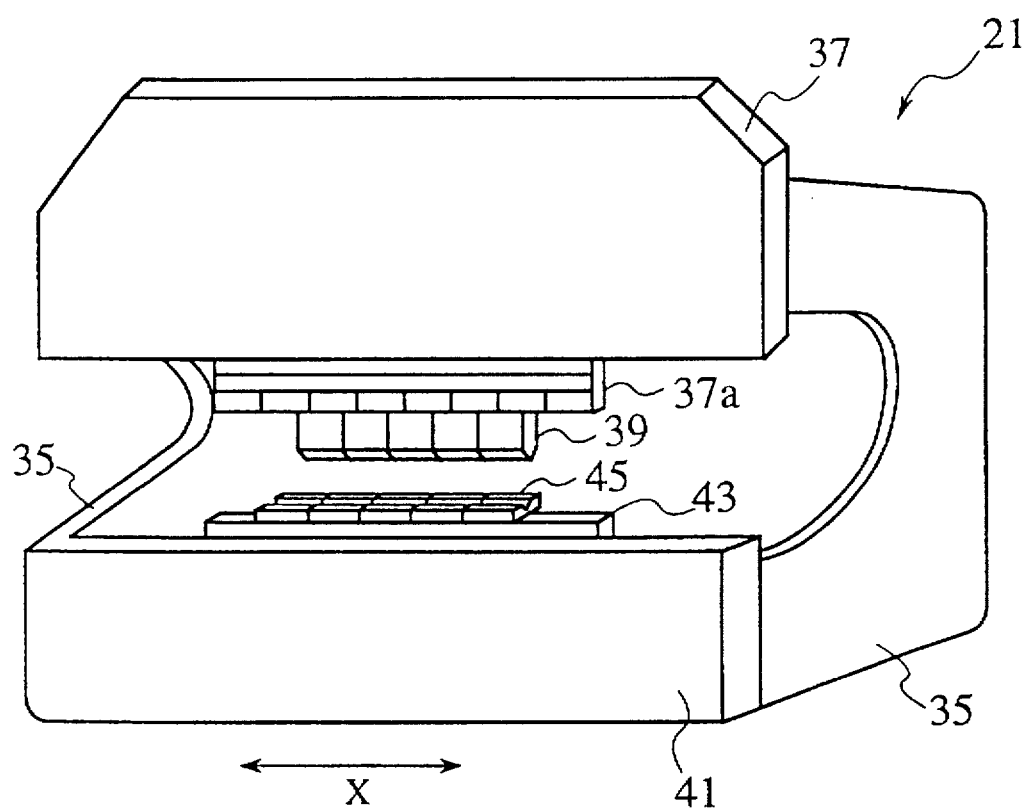
FIG. 13A and FIG. 13B respectively are a perspective schematic view and a schematic cross sectional view of a bending press used in an embodiment of the plate bending system according to the present invention.
Figure 13B:
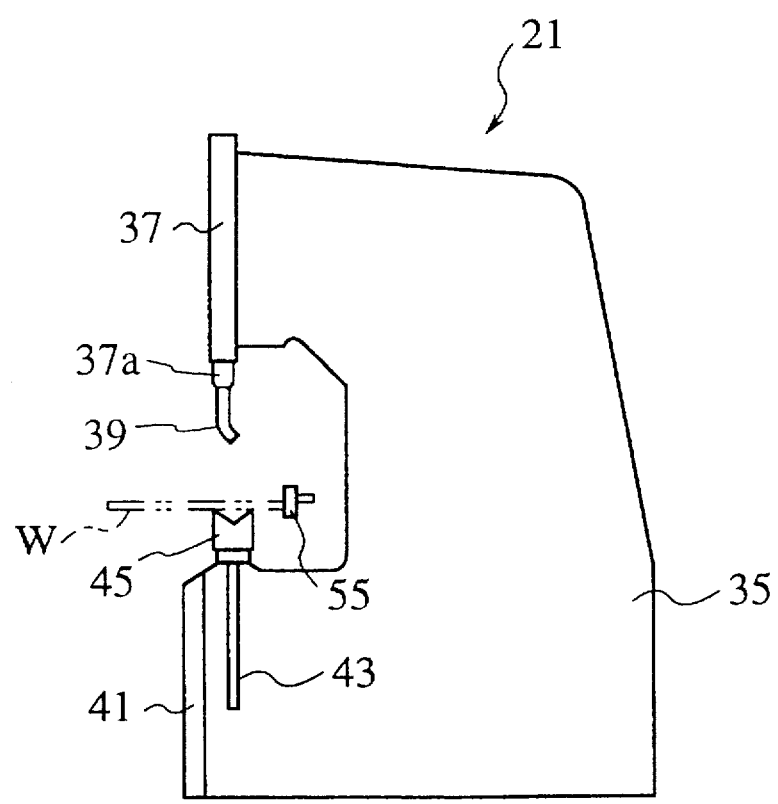

The first bending press 21 includes, for example, a C-shape frame 35, as shown in FIGS. 13A and 13B. A plurality of punches 39 are disposed at the lower end of an apron 37a, which is provided on an upper support plate 37 of the C-shape frame 35, along a straight line running in the x-axis direction. Moreover, a ram 43, which is movable vertically, is supported by a lower support plate 41 of the C-shape frame 35. A plurality of dies 45 for bending a plate (hereinafter called a "workpiece") W in cooperation with the punches 39, are disposed at the top end of the ram 43 along a straight line running in the x-axis direction. That is, when the workpiece is inserted between the punches 39 and the dies 45 and then the ram 43 is moved upwards, the punches 39 and the dies 45 are mutually engaged to one another so that the workpiece W held therebetween is bent upward.

Again referring to FIG. 1, connected to the terminal 25 are a keyboard 25c for entering data into the terminal 25, a CRT unit (hereinafter called a "CRT") 25b serving as a display unit for displaying data supplied from the terminal 25 and a bar-code reading unit (bar code scanner) 25a for reading bar codes made by the bar-code preparation apparatus 31a and providing the read bar code data to the terminal 25. Here, data can be entered into the terminal 25 by using touch keys provided on the CRT screen as well as the keyboard 25c.

Similarly to the first bending station 20, the second bending station 22 is provided with a second bending press 23 and a second computer terminal 27. A keyboard 27c, a CRT 27b and a bar-code reading unit 27a are connected to the terminal 27. The server 31 of the factory office 30 and the terminals 25 and 27 of the bending stations 20 and 22 are connected through a network 29 to one another so as to allow mutual data communication therebetween.

Figure 2:
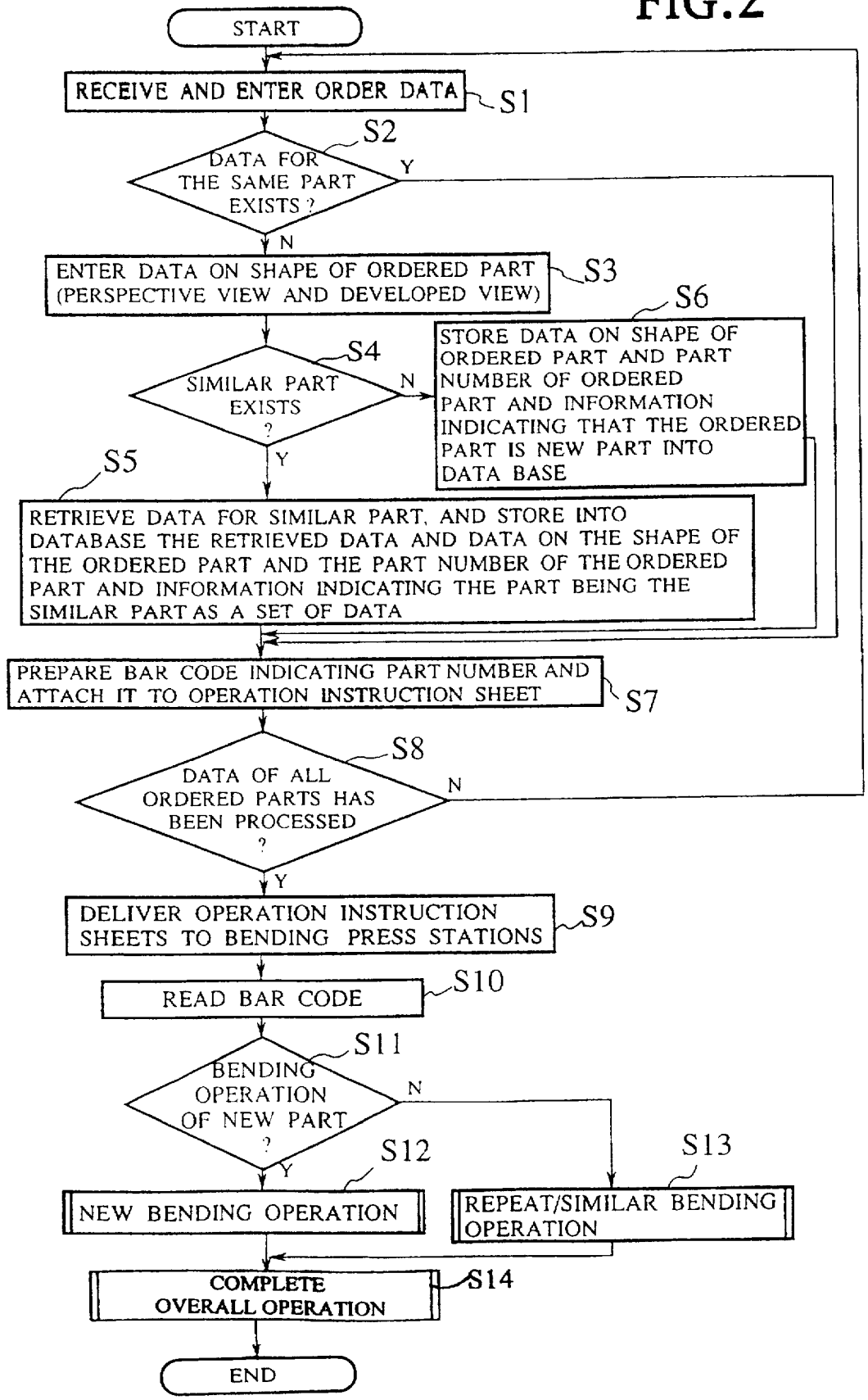
FIG. 2 is a flow chart of the overall operation of the plate bending system shown in FIG. 1.

Referring to FIG. 2, the overall operation of the plate bending system will now be described.

In step S1, various data concerning ordered part are received by the factory office 30. Such data contains, for example, the part number of the ordered part and data on the shape of the part. The part number is, for example, a combination of symbols and numerals, such as "PT123a". The symbol "PT" indicates the ordered part being a part of a complete product, and the numeral "123" specifies the type of the part, and the symbol "a" specifies the dimensions of the part indicated by "123". The data on the shape of the part consists of data for a 3D perspective view of the ordered part, data for a 2D unfolded view of the same or data for 2D, three views of the same; the 2D, three views consist of a front view, a plan view and a side view. In step S1, such data for the ordered part are entered into the server 31.

In step S2, the server 31 performs one or more searches on the basis of the entered part number to see whether bending operation data for a part that is the same as the ordered part is stored in the database 33.

When no data on the same part is in the database 33, an operator inputs into the server 31 the data on the shape of the ordered part in step S3. The data on the shape entered in step S3 consists of data concerning a 3D perspective view of the ordered part, data concerning a 2D unfolded view of the same or 2D three views of the same. When data on one of the views are entered, the server 31 calculates data on two other views on the basis of the entered data by a predetermined calculation method. For example, if data for the 2D three views are entered, the server 31 calculates data for the 3D perspective view and 2D unfolded view.

In step S4, the server 31 carries out a search on the basis of the part number to see whether data for bending operations for parts similar to the ordered part (i.e. similar parts) are stored in the database 33. For example, when the part number of the ordered part is "PT123a", a search is carried out to see whether the database 33 includes data for the parts designated by part numbers "PT123b", "PT123c" and "PT123d" and the like.

If it is detected in step S4 that the data for the similar parts is stored in the database 33, the operation proceeds to step S5, where data for the similar parts are retrieved from the database 33. Moreover, in step S5, the retrieved data, data on the shape of the ordered part, and the part number of the ordered part are stored into the database 33 together with information indicating the associated data is for a similar part. That is, in step S5 the operator stores into the database 33 the retrieved data, the part number of the ordered part, data on the shape of the ordered part, and the data indicating that the retrieved data item is data for a similar part, as a set of data.

If no part number of a similar part is detected in step S4, the operation proceeds to step S6. In step S6, the data on the shape of the ordered part and the part number of the ordered part are stored in the database 33 together with data indicating that the ordered part is a new part. That is, in step S6, the server 31 stores in the database 33 the data indicating that the ordered part is a new part, the part number of the ordered part, and the shape of the ordered part as a set of data.

In step S2, if the same part number as the part number of the ordered part is detected, the operation directly proceeds to step S7.

In step S7, the bar-code preparation apparatus 31a connected to the server 31 prepares a bar code sheet that specifies the part number of the ordered part. The prepared bar code sheet is attached to an operation instruction sheet to be delivered to bending stations 20 and 22.

In step S8, it is determined whether data of all of the ordered parts has been processed. When all data have not yet been processed, the operation returns to step S1. If the process has been completed, the operation proceeds to step S9.

In step S9, the factory office 30 assigns and delivers the operation instruction sheets to the bending station 20 or the bending station 22 in accordance with the skill of the operator at each bending station 20, 22 and with the availability of the bending stations. For example, an operation instruction sheet for a new part is delivered to a bending station at which a skilled operator is working, while an operation instruction sheet for the same or a similar part is delivered to a bending station at which a low skill operator is working.

When the operation instruction sheet is received by each of the bending stations 20 and 22, the operation proceeds to step S10. In step S10, the bar code attached to the operation instruction sheet is read by the barcode reading unit 25a or 27a. Thus, data for the ordered parts assigned to a bending station are retrieved from the database 33 and transmitted to either one of the terminals 25 and 27. As described above, when a ordered part assigned to a station is a new part, the retrieved data contains the part number of the ordered part, the shape of the ordered part, and information indicating that the ordered part is a new part. When the ordered part assigned is the same part (which means that the data for the same part as the ordered part has been stored in the database 33), the retrieved data contain the part number of the ordered part and data for the same part retrieved from the data base and information indicating that the retrieved data is for the same part. When the ordered part assigned to a station is a similar part (which means that the data for part(s) similar to the ordered part has been stored in the database), the retrieved data contain the data for the similar part, the part number of the ordered part, and the shape of the ordered part, information indicating that the retrieved data is data for the similar part.

In step S11, it is determined whether the assigned part is a new part, in other words whether the bending operation is for a new part. When the assigned part is a new part, the operation proceeds to step S12. In step S12, a new bending operation or new-part bending operation is performed as described in detail in the following with reference to FIGS. 3 and 4. On the other hand, when the ordered part is the same or a similar part, the operation proceeds to step S13, where a repeat (reiteration process) or a similar bending operation is performed as described in detail in the following with reference to FIGS. 12A and 12B. Then, the operation proceeds to step S14, where the overall operation is completed.

Figure 3:
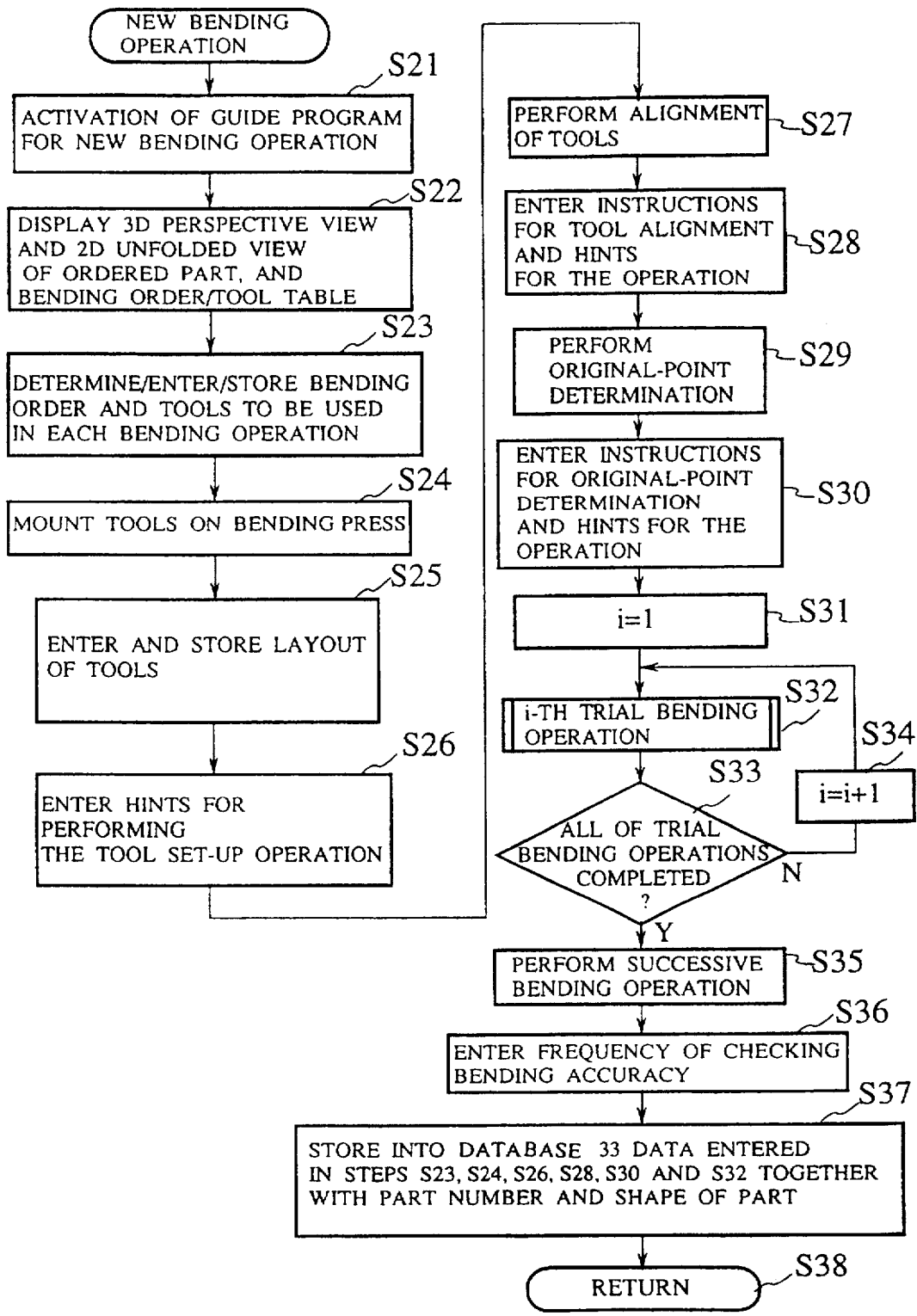
FIG. 3 is a flow chart showing a detailed operation of a step in the flow chart shown in FIG. 2, and specifically showing the operation of a step for manufacturing a new part or product in FIG. 2.

Referring now to FIG. 3, the new-part bending operation performed in step S12 will be described in detail. It is supposed that the new-part bending operation is performed in the first bending station 20.

As described above, when the assigned part is a new part, the data that the terminal 25 retrieves in step S10 of FIG. 2 includes the part number of the ordered part, data for the shape of the part (i.e. data of the 2D three views, the 3D perspective view or the 2D unfolded view) and information indicating that the part is a new part.

If, in step S11 of FIG. 2, it is determined that the ordered part is a new part, the operation proceeds to step S21, where a guide program for a new bending operation is activated.

Figure 5:
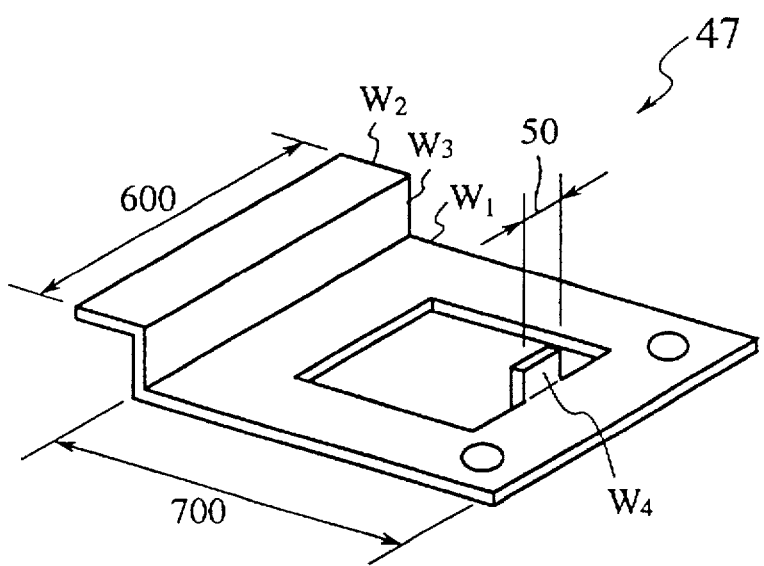
FIG. 5 is a schematic view showing a part that is displayed on the screen of a terminal computer in step S22 in FIG. 3.
Figures 6A, 6B:
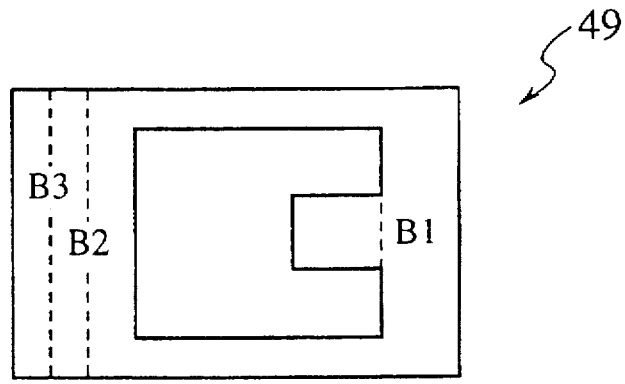
FIG. 6A and FIG. 6B respectively are a 2D unfold view of the shape of the part and a view of a table that shows bending lines and tools to be used, both of the views being displayed on the screen of the terminal computer in step S23 shown in FIG. 3.

In step S22, in accordance with the guide program, the shape of the ordered part as well as the part number of the ordered part and information indicating that the ordered part is a new part are displayed on the screen of the CRT 25b. For example, a 3D perspective view 47 of the part with dimension lines for "600", "700" and "50" as shown in FIG. 5 and/or a 2D unfolded view 49 of the part with bending lines B1, B2, B3 as shown in FIG. 6A are displayed on the screen of the CRT 25b. Moreover, a bending order/tool table 51 as shown in FIG. 6B are displayed on the screen of the CRT unit 25b together with the views of the part. In FIG. 6B, when the table initially appears on the screen, the bending line column, the tool column, and the tool length column are blank (not shown in the drawings).

In step S23, the operator refers to, for example, the 3D perspective view 47 as shown in FIG. 5 and the 2D unfolded view as shown in FIG. 6A and determines a bending order in which a workpiece is bent along the bending lines B1, B2 and B3. Moreover, the operator selects tools (punches and dies) for bending the workpiece along the bending lines B1, B2 and B3. The determination of the bending order is performed by, for example, sequentially clicking the bending lines B1, B2 and B3 on the 2D unfolded view as shown in FIG. 6A with a mouse pointer and the like. As a result, each of the bending line numbers B1, B2, B3 are entered, in order of bending operation, into each line of the bending line column of the bending order/tool table 51 as shown in FIG. 6B. For example, as shown in FIG. 6B, if the bending lines are bent in order of B3, B2 and B1, bending line B3 is entered into the first line for the bending order 1, bending line B2 entered into the second line for the bending order 2 and bending line B1 entered into the third line for the bending order 3.

Then, the operator determines tools for bending the workpiece along the bending lines B1, B2 and B3. Selections of the tools are performed by, for example, entering suitable die numbers into lines in the column for the tool number in FIG. 6B. In the example shown in FIG. 6B, punch P1 and die D1 are used for the bending along the bending lines B3 and B2, and punch P2 and die D2 used for the bending along the bending line B1. Thus, data of P=P1 and D=D1 are entered into each of the lines for bending lines B3 and B2, and data of P=P2 and D=D2 are entered into the line for bending line B1. For example, the data P1 and D1 indicate the punch number 402 and the die number 30286 (11) and, the data P2 and D2 indicate the punch number 14702 and the die number 30286 (10). To assist the selection of the tools, a menu for available tools may be displayed on the screen of the CRT so that the operator can select a suitable tool from the menu.

Then, the lengths of the selected tools are determined and entered into the tool length column of the table 51. For example, as the length of punch P1 and die D1, 835 mm is entered into the first and the second lines of the table, while 50 mm is entered into the third line thereof, as the length of the punch P2 and die D2, as shown in FIG. 6B. Then, the bending order/die table 51 are entered into a memory of the terminal 25 by suitable operation at the keyboard 25c.

In step S24, the operator selects tools (punches and dies) from a die magazine while referring to the bending order/die table 51 on the CRT screen 25b. Then, the operator places and mounts the selected tools on the apron 37a and the ram 43 of the first bending press 21 by using his experience and skill.

Figure 7A:
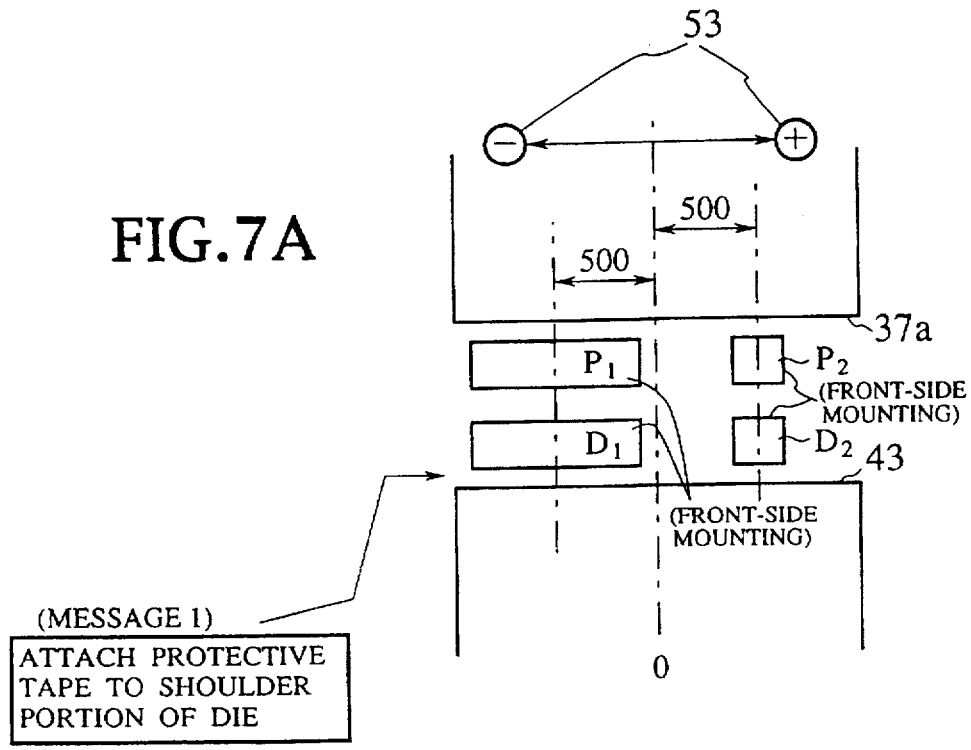
FIG. 7A and FIG. 7B are views showing layout of tools to be used and operation support information relating to the layout, the views being displayed on the screen of the terminal computer in step S25 and step S26 in FIG. 3.

In step S25, the operator enters into the terminal 25 data for the arrangement of the tools (or the layout of the tools) on the apron 37a and the ram 43. For this purpose, when a suitable key on the keyboard 25c is depressed, an image as shown in FIG. 7A appears on the screen of the CRT 25b. Although omitted from the drawing, when the image of FIG. 7A initially appears on the screen, only figures showing the apron 37s and the ram 43, central position 0 and a direction symbol 53 are displayed, while the other figures and characters are not displayed. After the foregoing screen is displayed, the operator enters symbols and/or figures of the punch P1 and die D1 into the terminal in such a manner, for example, that the central position of each figure is positioned away from the central position O by a distance of 500 mm, as shown in FIG. 7A.

Moreover, description, "front-side mounting" or "reverse-side mounting" may be entered for each of the punch and the die; these information specify whether punch P1 and die D1 are mounted with the font-side facing forward or the reverse side facing forward. Likewise, symbols and/or figures showing punch P2 and die D2 are entered in such a manner, for example, that the central position of each figure is positioned away from the press central position O by a distance of +500 mm. The information, "front-side mounting" or "reverse-side mounting" that indicates whether punch P2 and die D2 are mounted with the front-side facing forward or the reverse side facing forward may also be entered.

Figure 7B:
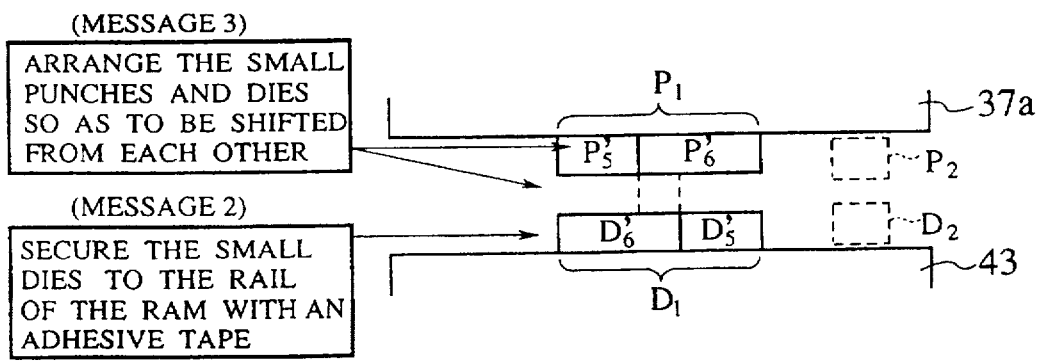

In step S26, after the data for the arrangement of the tools are entered, the guide program generates a question whether there are additional hints that are useful for performing the tool set-up operation and that are worthwhile to be recorded. If the operator thinks of such hints, he enters the same into the terminal 25 as an operation support information. For example, when the punch and the die are to be mounted on the bending press, it is preferable to attach a tape to the shoulder portion of the die D1, D2 so that the dies D1, D2 are not flawed when attached on the ram 43. Thus, a message 1, "Attach a protection tape to the shoulder portion of the die" may be entered as a hint, as shown in FIG. 7A. Further, if the punch P1 and the die D1, for example, respectively are composed of small punches P5', P6' and diesD5', D6', it is preferable to preliminary secure the small dies D5', D6' to a rail (not shown) of the ram 43 with an adhesive tape; further it is preferable that the small punches P5', P6' and dies D5', D6' are arranged on the rail of the ram so as to be laterally shifted from each other, as shown in FIG. 7B. Thus, additional hints, such as message 2, "Secure the small dies to the rail of the ram with an adhesive tape" and message 3, "Arrange the small punches and dies so as to be shifted from each other" are entered into the terminal, as shown in FIG. 7B.

Figure 8:
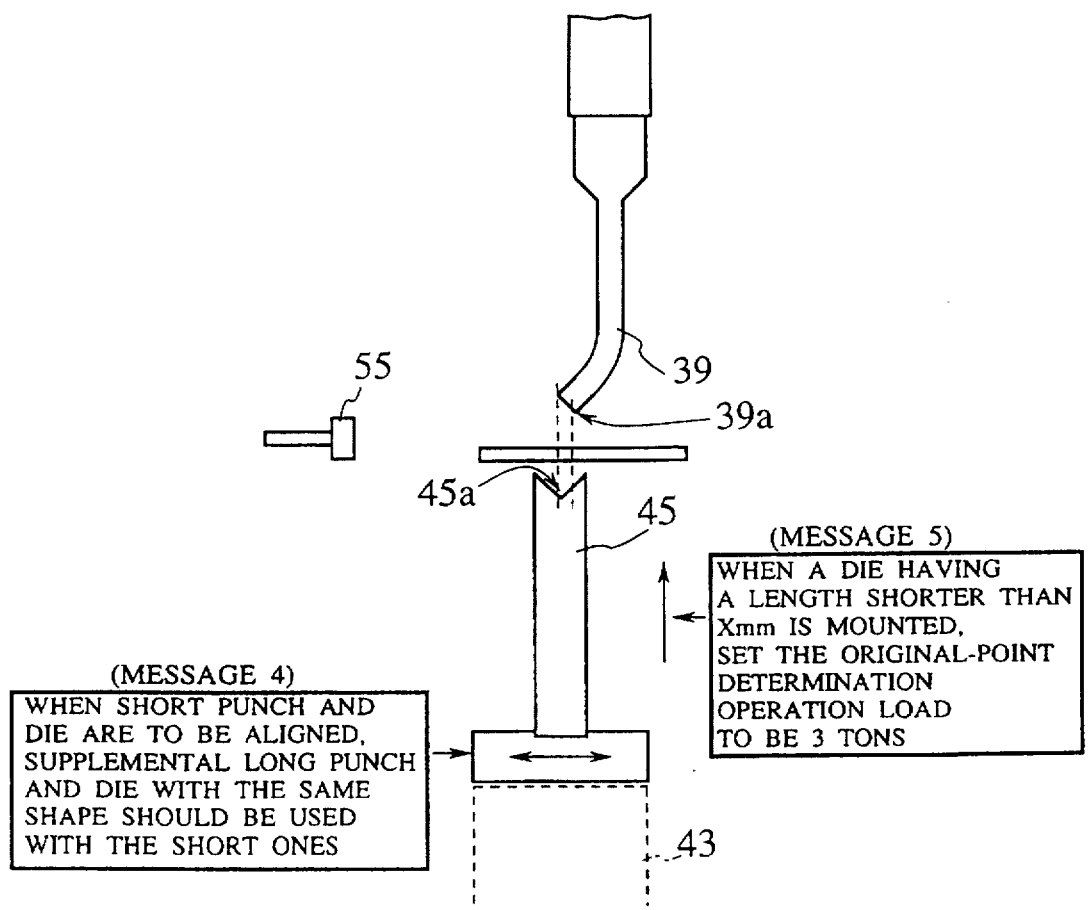
FIG. 8 is a cross sectional view of a die and a back gauge device that are displayed on the screen of the computer terminal in relation to a alignment and an original-point determination operations in steps S28 and s30 in FIG. 3.

In step S27, an alignment of the punch and the die in the longitudinal direction is performed. This operation is as follows. As shown in FIG. 8, the die 45 of the first bending press 21, for example, is generally mounted on the ram (or the rail of the ram) 43 so as to be movable in the longitudinal direction (i.e. in the lateral direction in FIG. 8). Therefore, when the die 45 is initially mounted on the ram 43, the position of a bottom portion 45a of a recess of the die 45 is normally displaced in the longitudinal direction from the position of the apex 39a of the punch as shown in FIG. 8. As a result, before bending operation, the longitudinal position of the die 45 is adjusted in the longitudinal direction so that the bottom portion 45a of the recess coincides with the apex 39a of the punch. This operation is called the alignment of the tools in the longitudinal direction. Here, when the lengths of the punch and the die are too short to precisely align the tools, supplemental punch and die with the same shape and longer dimensions are temporarily mounted on the rail of the ram43.

In step S28, after the alignment of the tools are performed, the operator enters an instruction on the execution of the alignment of the tool as operation support information. Then, the guide program generates a question whether there is hints that are useful for performing the alignment of the tool. If the operator thinks of such hints, he enters the same into the terminal 25 as additional operation support information. For example, the operator may input a hint that "When short punch and die are to be aligned, supplemental long punch and die with the same shape should be used with the short ones" is entered as a message 4, as shown in FIG. 8. The guide program may generate similar questions in the following steps whenever useful hints relating to those steps are to be entered although it may not be explicitly mentioned hereinafter.

In step S29, an original-point determination operation (or an original-point adjustment operation) is performed. The original-point (or a reference point) is a position of the die 45 relative to the punch 39 in which position the die 45 is directly engaged to the punch 39 with a predetermined engaging force without workpiece being held between the punch 39 and the die 45. The original-point determination operation is necessary for the reason as follows. That is, the bending angle of a workpiece bent by the punch and the die is generally determined by the distance moved by the die 45 relative to the punch 39 during bending operation. However, during the bending operation, the side frame 35 or the like of the bending press is deformed. Thus, the distance moved by the die 45 from a reference point determined with no engaging force between the punch and die does not corresponds to the bending angle of the workpiece to be bent by the punch and the die. Therefore the position of the die 45 in the above-mentioned condition where a predetermined force acts between the punch and the die is determined as a correct original position (or a reference position) of the die 45. It should be noted here that the load, which is applied between the punch and the die, is selected in accordance with the length of the mounted die. That is, if a die having a length longer than a predetermined length is mounted, a load of 7 tons is applied between the punch and the die to determine the original point of the die. On the other hand, if a die shorter than a predetermined length is mounted, the load of 7 tons may break the punch and the die. Therefore, a 3 tons, for example, which is smaller than the durable pressure for the punch and the die is applied between the punch and the die to determine the original point of the die. In the present embodiment, it is supposed that the mounted die is longer than the predetermined length, and the load of 7 tons is applied between the punch and the die.

In step S30, an instruction for performing the original-point determination operation (or the original-point adjustment operation) and a hint relating to the original-point determination operation are entered and stored in the memory of the terminal 25 as operation support information. For example, a message 5, "When a die having a length shorter than x mm is mounted, set the original-point determination operation load to be 3 tons" is entered as shown in FIG. 8. In place of entering the message 5, a program for performing following steps may be provided in the terminal: First, it retrieve the tool number and the length of the tool entered in step S23. When the tool is longer than a predetermined length, it generates a first message "Perform the original-point determination with 7 tons" is generated. On the other hand, when the die is shorter than the predetermined length, it generates the second message "Perform the original-point determination with 3 tons".

In steps S31, S32, S33 and S34, trial bending of a workpiece for manufacturing the part (or the product) as shown in FIG. 5 is performed.

For this, in step S31, a trial bending operation number i for specifying each of bending operations is set as 1.

In step S32, the i-th trial bending operation is performed while operation support information relating to the i-th bending are entered, as described in detail below.

In step S33, it is determined whether all of the trial bending operations have been completed. If they have not been completed, the step number i is increased by one in step S34, and then the operation returns to step S32. If all of the trial bending operations have been completed in step S33, the operation proceeds to step S35, where a plurality of workpieces are successively bent in the manner determined by the trial bending operations in step S32. During this successive bending operations, the bending accuracy is inspected each time a predetermined number of workpieces are processed. If the operation accuracy does not satisfy a predetermined requirement, values D and L, which is described later, are modified.

After the successive bending operation has been completed, in step S36, the operator enters an operation support information on the frequency of checking of the bending accuracy, which is performed in other bending operation, such as in the operations in steps in FIGS. 11. For example, an operation support information to inspect the accuracy for every ten workpieces is entered.

In step S37, a variety of information and data including the operation support information relating to the bending operation entered in steps S23, S24, S26, S28, S30, S32, S35 and S36 are transmitted from the terminal 25 to the server 31 together with the part number and the shape of the part, and they are all stored in the database 33 of the server 31. In step S38, the bending operation for the new part is completed.

Figure 4:
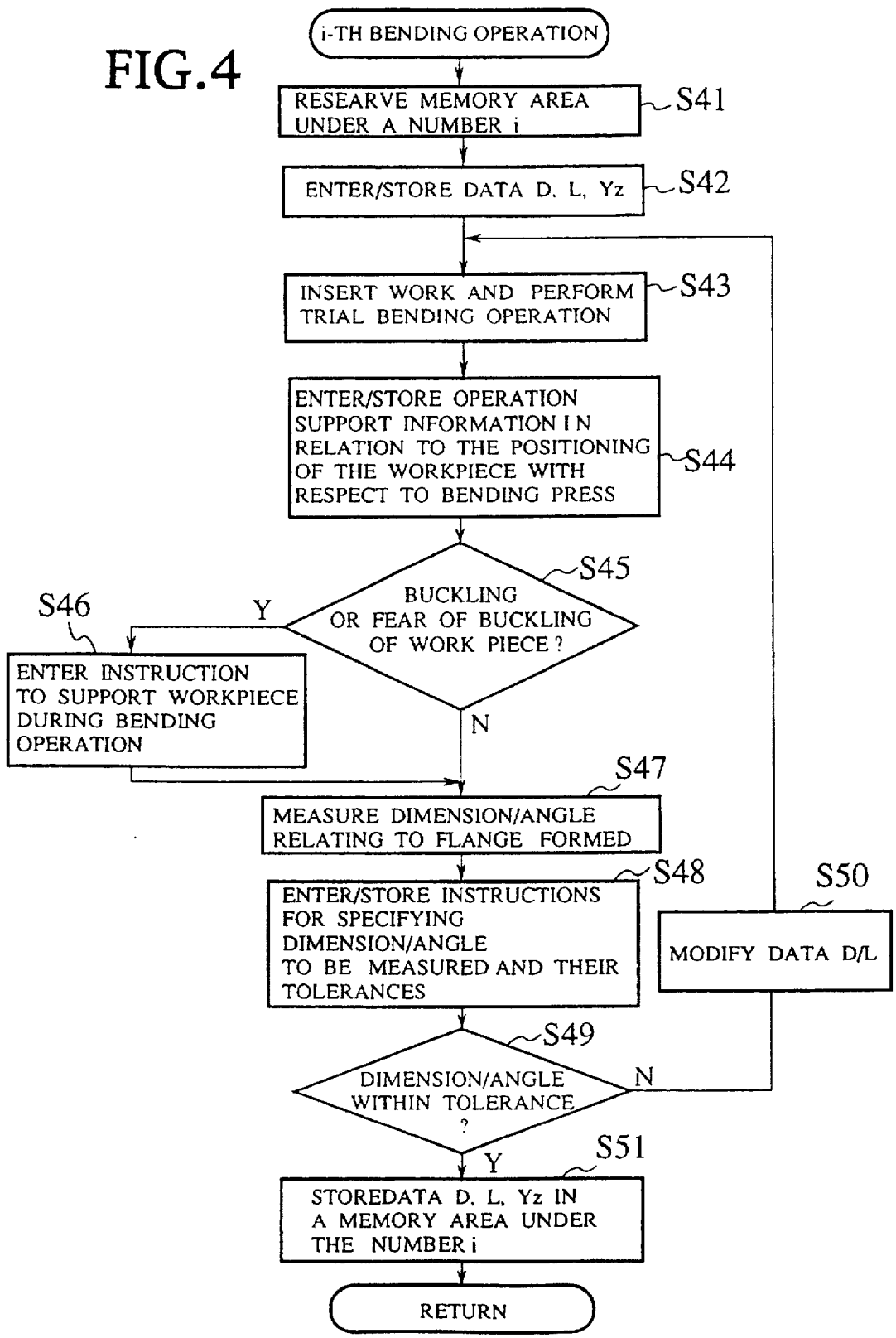
FIG. 4 is a flow chart showing a detailed operation of a step in the flow chart shown in FIG. 3, and specifically showing the operation a step for performing an i-th bending operation on the plate to manufacture the new part in FIG. 3.

FIG. 4 is a flow chart for showing in detail the i-th trial bending operation and operation of entering support information relating to the same, which are performed in step S32 in FIG. 3.

In step S41, a memory area is reserved under a number i in a memory of the terminal 25. When the program of FIG. 4 is first called upon, the number i is set to be 1 since the i has been set to be 1 in step S31.

Figure 9A:
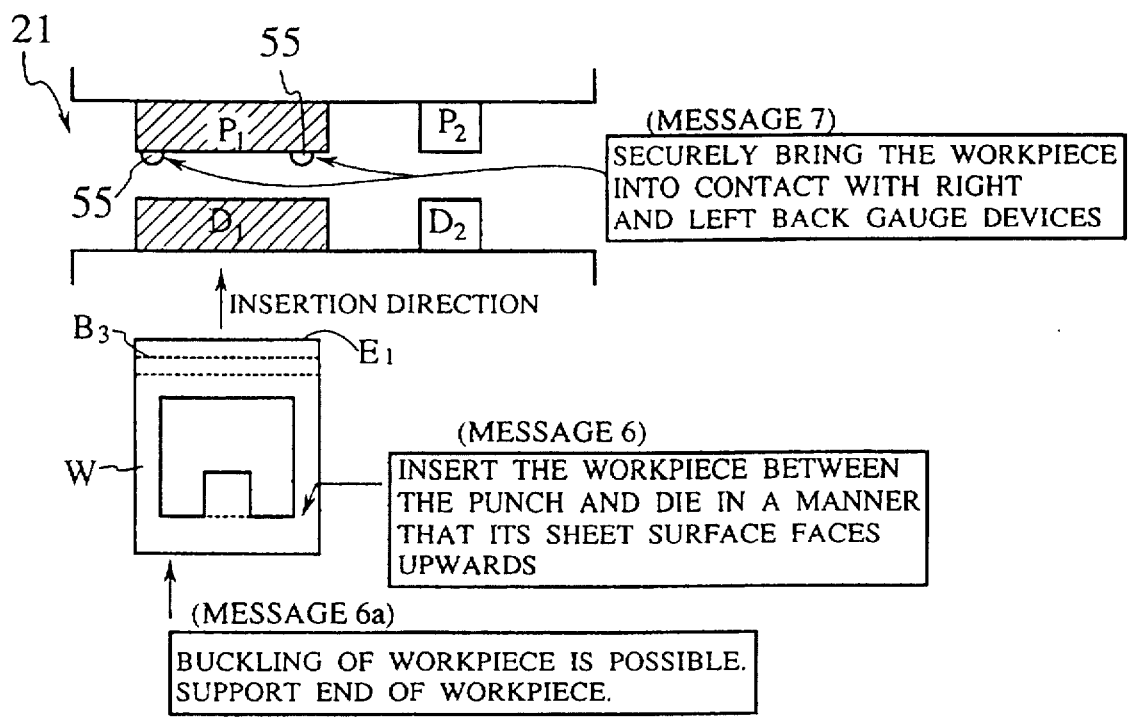
FIG. 9A, FIG. 10A and FIG. 11A are schematic views showing attitudes of a workpiece with respect to tools on a bending press and operation support information relating to positioning of the workpiece with respect to the bending press, which are displayed on the screen of the terminal computer in step S44 in FIG. 4.
Figure 14:
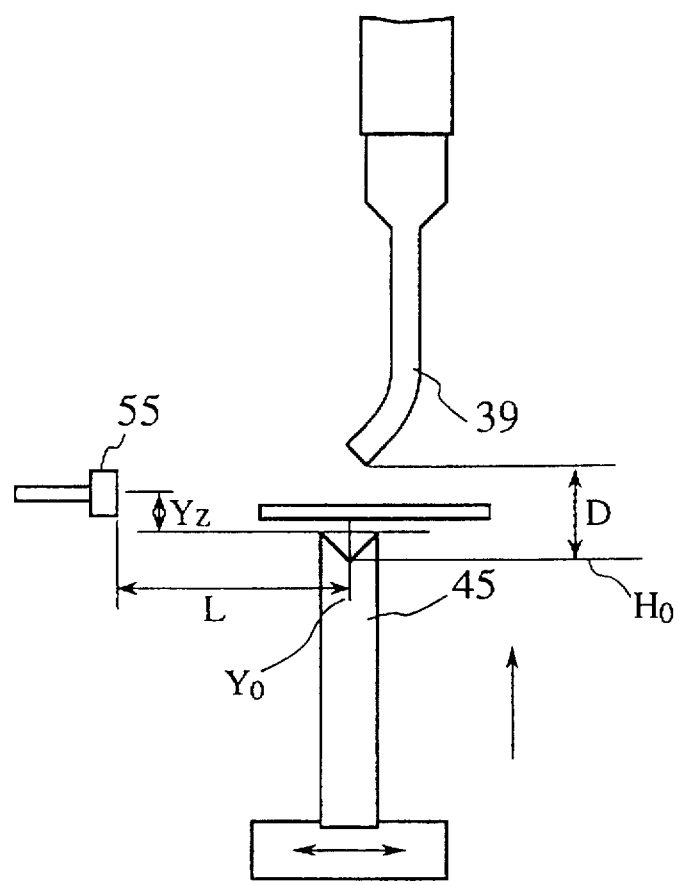
FIG. 14 is an explanatory view for explaining value D, value L and value Yz in the bending press.

In step S42, in order to bend a workpiece along bending line B3 (FIG. 6A) through an angle of 90°, numerical control data D, L and Yz for the bending press 21 are entered into the terminal 25. As shown in FIG. 14, the data D specifies the vertical position of the die 45 relative to the original position (or the reference position) $H_0$ determined in step S29. The data L specifies the position of a back gauge device 55 in the longitudinal direction (i.e. in the lateral direction in FIG. 14) relative to a reference position which is, for example, the central position $Y_0$ of the die 45. The data Yz specifies the vertical position of the back gauge device 55 relative to a reference position, which is, for example, the top end of the die 45. As described above, the data D determines the bending angle of the workpiece W to be bent by the bending press 21, while the data L determines the width of the workpiece W between an edge E1 (see FIG. 9A) and the bending B3. The value Yz is used to adjust the vertical position of the back gauge device 55 during bending operation. Specifically, the height of the back gauge device is adjusted to correspond to the height of a flange formed at the rear end of the workpiece (for example, flange W2 shown in FIG. 9B). For example, in FIG. 10A, the workpiece is inserted between the punch and die in an attitude or position that the flange W2 projects downward relative to a major portion of the workpiece. Thus, the back gauge device 55 is located in a vertical position lower than that as shown in FIG. 9A so as that the flange W2 is properly brought into contact with the back gauge device 55.

When the data L and Yz are entered, the back gauge device 55 is moved by the control of the terminal 25 in the vertical and longitudinal directions to a position determined by the data.

In step S43, the workpiece W is inserted between the punch 39 and the die 45, and the rear end thereof is brought into contact with the back gauge device 55 to position the same with respect to the punch and die. Thereafter, the first trial bending is performed on the workpiece W along the bending line B3.

In step S44, on the basis of the trial bending operation performed in step S43, operator enters operation support information in relation to the positioning of the workpiece W relative to the punch and die. These operation support information includes hints relating to the positioning of the workpiece. Specifically, as shown in FIG. 9A, when the first trial bending operation is completed, a figure showing the tools P1, D1 on bending press 21 and the workpiece W appears on the screen of the CRT 25b in response to a completion signal from the bending press 21. In order to inform the operator the appearance of the figure, a sound buzzer and the like may be provided. Thus, for example, when the sound buzzer is activated, the operator moves to a position in front of the terminal 25. In the first bending operation, the punch P1 and the die D1 on the bending press 21 are used to perform the bending operation (see FIG. 6B). In order to save this information, the color of the figures of the punch P1 and D1 is changed into gray as shown in FIG. 9A. Then, information concerning positioning of the workpiece W with respect to the punch and die is saved. For this, the figure of the workpiece W on the CRT screen is moved translationally and rotationally to a position in front of the punch P1 and the die D1, as shown in FIG. 9A. This movement of the figure of the workpiece can be carried out by using a mouse (not shown) or a joystick (not shown) connected to the terminal 25. As described before, in the first bending operation, the edge E1 of the workpiece W is brought into contact with the back gauge device 55, and the bending operation is performed along the bending line B3. Therefore, the figure of the workpiece W is located in a attitude as shown in FIG. 9A with respect to the figure of the punch P1 and die D1.

Then, as shown in FIG. 9A, the operator enters the messages 6 and 7 relating to the positioning of the workpiece W as hints. Specifically, the message 6, "Insert the workpiece between the punch and die in a manner that its sheet surface faces upwards" is a hint for specifying the side of the workpiece W to be inserted between the tool. The "sheet surface" means a surface of the workpiece on which a vinyl sheet is attached; the vinyl sheet is attached on that surface to protect that surface from being scratched during transportation. The side of the workpiece can also be designated by specifying the directions of burrs formed on the workpiece. In this case, a message, for example, "Locate the workpiece in such a manner that the direction of burrs face downward" is entered. The message 7, "Securely bring the workpiece into contact with right and left back gauge devices" is a hint for reminding the operator to securely engaging the rear end of the workpiece with the right and left back gauge devices 55 when the workpiece W is inserted between the punch and die. This message 7 is entered because a precise bending cannot be achieved if either one of the back gauge devices fails to contact the rear end of the workpiece. After these information are displayed on the CRT 25b, all data are stored in a memory of the terminal 25.

In step S45, the operator determines in accordance with the result of the trial bending operation whether buckling of the workpiece has occurred during first trial bending operation or whether the buckling of the workpiece could occur during the first bending operation during the successive bending operation in step S35. If an affirmative determination is made, the operation proceeds to step S46.

In step S46, the operator enters an instruction to support the end of the workpiece W from a lower position during the bending operation as a operation support information (see message 6a shown in FIG. 9A).

In step S47, the part manufactured by the trial bending operation is inspected. Specifically, the operator measures the length and angle of a flange W 2 formed by the first bending operation.

Figure 9B:
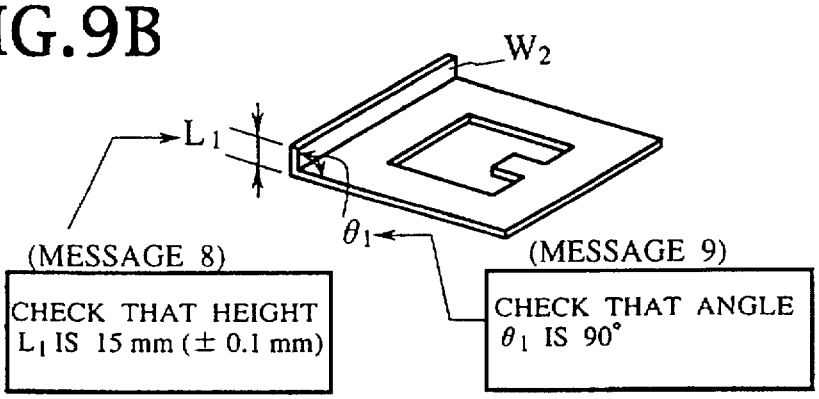
FIG. 9B, FIG. 10B and FIG. 11B are schematic views showing the parts with dimensions data and operation support information relating to the inspection of the dimensions, which are displayed on the screen of the terminal computer in step S48 in FIG. 4.
Figure 9C:
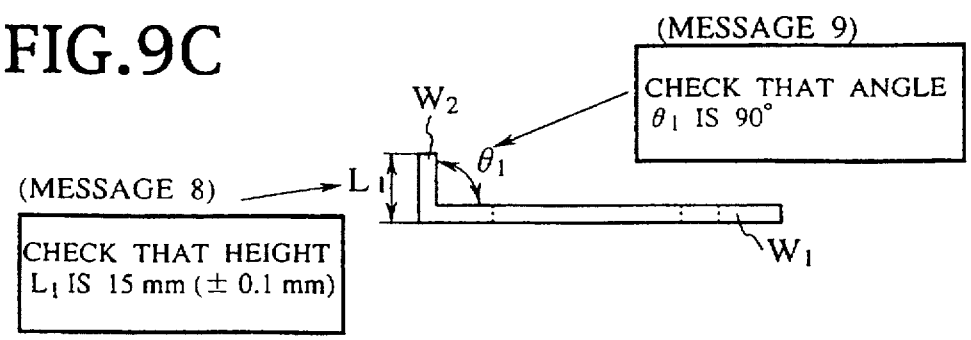
FIG. 9C, FIG. 10C and FIG. 11C are other schematic views showing the parts with dimension data and operation support information relating to the inspection of the dimensions, which are displayed on the screen of the terminal computer in step S48 in FIG. 4.

After the measurement has been carried out, in step S48, the operator enters into the terminal an instruction or a hint for specifying dimensions and angles to be measured and together with their tolerances, as operation support information. Specifically, as shown in FIG. 9B, when the shape of the workpiece W including the flange W2 formed by the trial bending operation is displayed on the screen of the CRT 25c, the operator enters symbols relating the length "L1" of the flange W2 and symbols relating the angle "θ 1" of the same as an operation support information. Moreover, a message 8 "Check that height L1 is 15 mm (±0.1 mm)" and a message 9 "Check that angle θ 1 is 90°" are entered. The shape of the flange W2 may be displayed in the form of a cross sectional view, as shown in FIG. 9C. By displaying the shape of the flange with the cross sectional view, the height L1 of the flange being a dimension including the thickness of bottom surface portion W1 of the workpiece W can be more easily understood. In order to emphasize that the dimension L1 includes the thickness of the bottom surface portion W1, a message "Note that the dimension L1 includes the thickness of the bottom surface portion W1" may be added to the display in FIG. 9B or 9C.

After entering the instruction or hint for measuring the height L1 and the angle θ 1 of the flange, in step S49, the operator determines whether the dimension L1 and the angle θ 1 are within a required tolerance. For example, it is determined whether the dimension L1 is within a range of 15 mm±0.1 mm. If it is determined in step S49 that the dimension L1 is not within the range, either or both of the values D and L are modified in step S50. Then, the operation returns to step S43 so that the trial bending operation is again performed.

If the dimension L1 and the angle θ 1 are within the required range in step S49, the foregoing data D, L and Yz are stored in step S51 in the memory area under the number i.

Trial bending operations for the process number i=2 and for the process number i=3 are performed in a manner similar to the trial operation for the process number i=1.

Figure 10A:
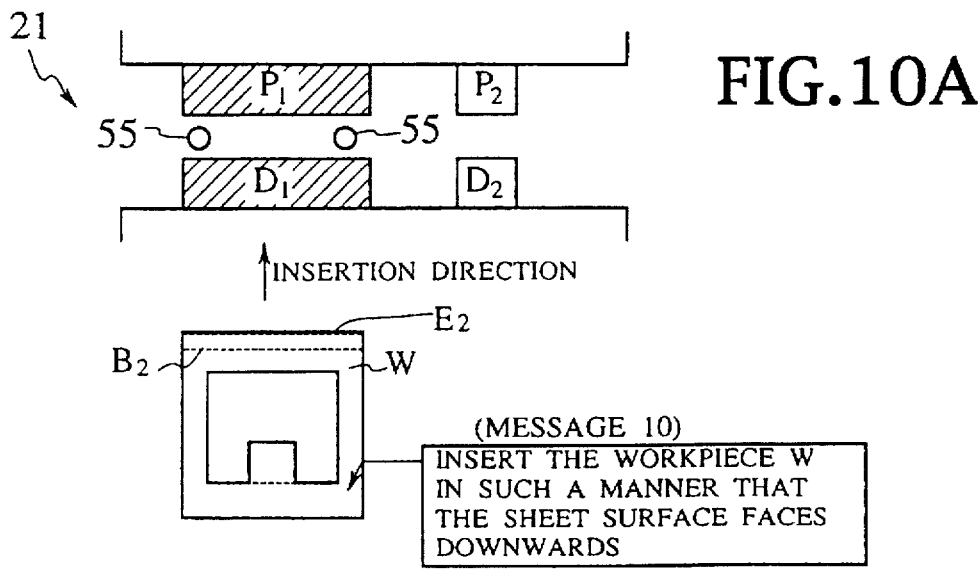

Specifically, when the process number i=2, in step S44, the figure of the workpiece W that has been bent along the bending line B3 is displayed on the screen of the CRT 25c together with the bending press 21, as shown in FIG. 10A. In the second trial bending operation, the punch P1 and the die D1 are again used to perform the bending operation along the bending line B2. Therefore, the figures of the punch P1 and the die D1 are displayed in gray, as shown in FIG. 10A. The back gauge device 55 is brought into contact with the flange W2 formed in the first bending operation. Therefore, as shown in FIG. 10A, the figure of the back gauge device 55 is moved to a position lower than that of the back gauge device 55 in FIG. 9A. Then, the figure of the workpiece W is suitably moved until it has an attitude (or an orientation) that the edge E2 faces toward the punch P1 and the die D1, as shown in FIG. 10A. In the second trial bending operation, the workpiece W is bent along the bending line B2 in a direction opposite to that in the first bending operation. Therefore, a message 10, "Insert the workpiece W in such a manner that the sheet surface faces downwards" is entered.

Figure 10B:
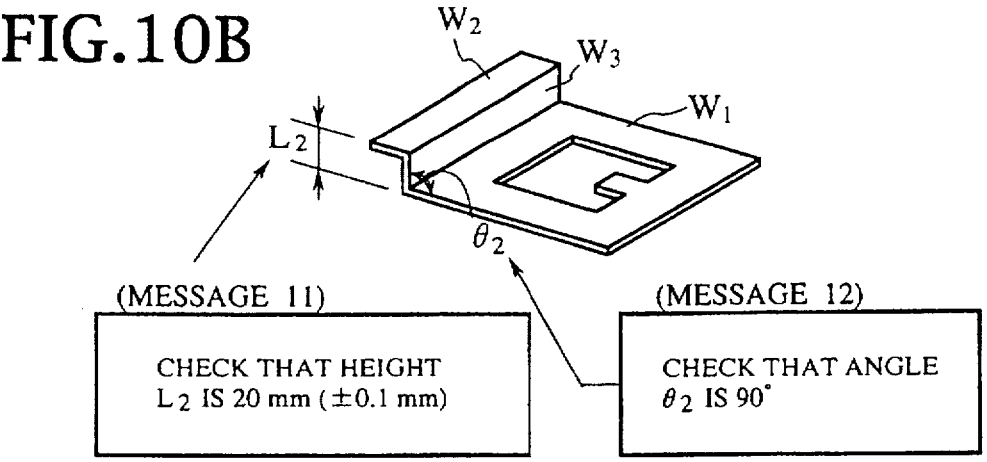
Figure 10C:
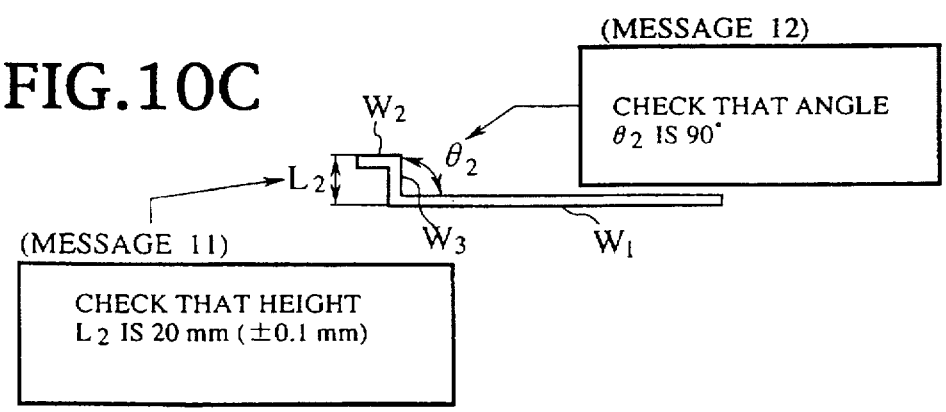

In step S48 in the second trial bending operation, the shape of the workpiece including the flange W2 formed in the first trial bending operation and the flange W3 formed in the second trial bending operation is displayed, as shown in FIG. 10B. Therefore, the operator inputs figures or symbols relating the dimension L2 and the angle θ 2, which must be measured in relation to the flange W3, as shown in FIG. 10B. Moreover, messages 11 and 12 to measure the dimension L2 and the angle θ 2 are entered. The shape of the workpiece including the figures or symbols relating the dimension L2 and the angle θ 2 may be displayed in the form of a cross sectional view, as shown in FIG. 10C. This view clearly shows that the dimension L2 includes the thickness of the flange W2 and the base portion W1.

Figure 11A:
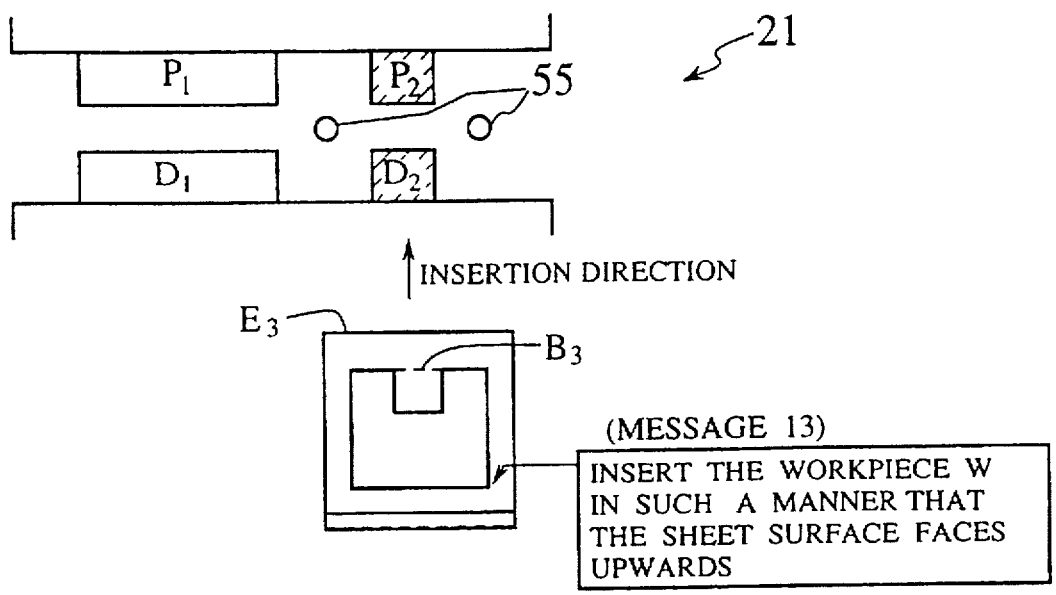

In case of the process number i=3, in step S44, the shape of the workpiece W that has been subjected to the first and second bending operations is displayed together with the punches and dies of the press 21 on the screen of the CRT 25c, as shown in FIG. 11A. In the third trial bending operation, the punch P2 and the die D2 are used for the bending operation. Therefore, the punch P2 and the die D2 are displayed in gray. Moreover, the figure showing the back gauge device 55 is moved to positions around the punch P2 and the die D2. Then, the operator moves the figure showing the workpiece W until the end E3 faces the punch P2 and the die D2, as shown in FIG. 11A. In the third bending operation, the workpiece W is bent along the bending line B1 in the same direction as that in the first bending operation. Therefore, a message 13 instructing this, that is, "Insert the workpiece W in such a manner that the sheet surface faces upwards" is entered.

Figure 11B:
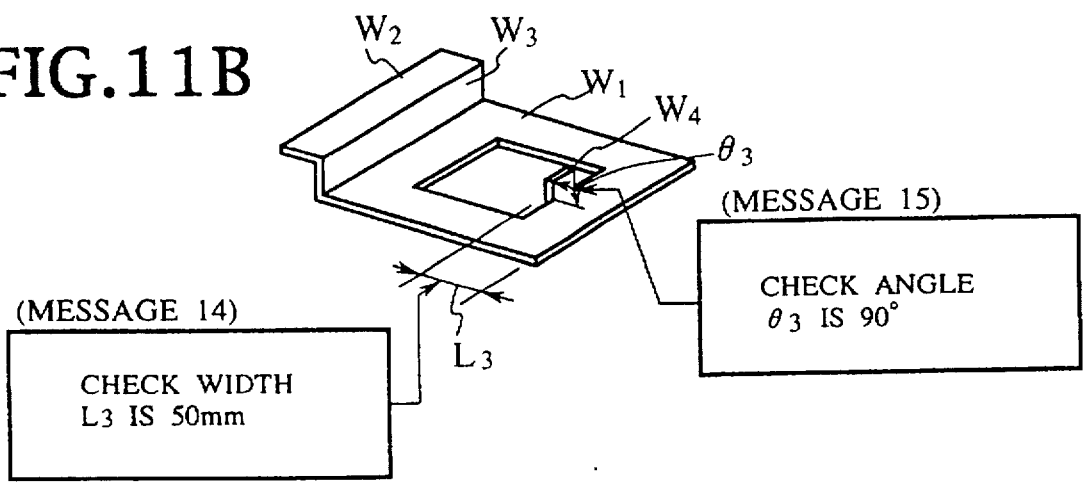
Figure 11C:
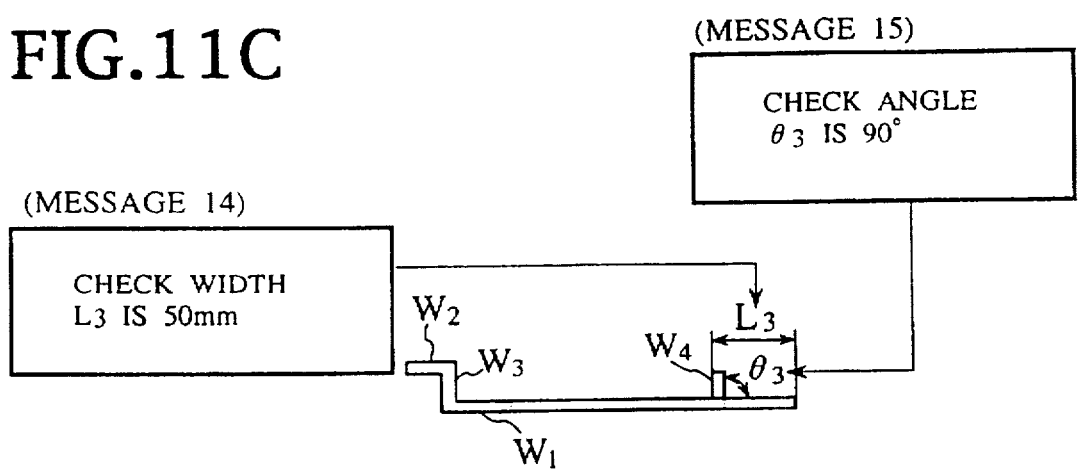

In step S48 in the third trial bending operation, the shape of the workpiece W that has the flange W2 formed in the first bending operation, the flange W3 formed in the second bending operation and the flange W4 formed in the third bending operation is displayed, as shown in FIG. 11B or FIG. 11C. Then, the operator inputs symbols relating to width L3 and angle θ 3 relating to the flange W4 formed in the third trial bending operation and messages 14 and 15 to measure these dimensions.

As described above, in the new bending method according to this embodiment, a skilled operator stores into the terminal computer 25 the operation information for efficiently performing a trial bending operation in the part, as operation support information or guide information or hints, while performing the trial bending operations. Moreover, the operation information is transmitted to and stored in the data base 33 of the server 31. Therefore, if the same or similar part is ordered later, the operation information stored for each part is retrieved from the data base 33 so that an optimum operation for manufacturing the ordered part is performed easily and quickly. In particular, even an operator without skill can perform a necessary bending operation easily and quickly by referring to the operation information above.

Further, in the foregoing method, a guide program for guiding a new bending operation is activated (see step S21) when an operator enter into the terminal 25 an instruction for the novel bending operation. According to the guide program for a novel bending operation, the terminal 25 urges the operator to enter suitable information including operation support information relating to set-up operation (preparation operation) and the bending operation after the operator has completed actual set-up operation and bending operation. Therefore, the operator can securely enter suitable information including the operation support information.

As described above, in step S37, the variety of the information that relates to the bending operation for the new part and are entered in steps S23, S25, S26, S28, S30, S32 (including steps S42, S44, S46, S48, S50 and S51) and step S36 are stored in the database 33 of the server 31 together with the part number and the shape of the part. The following Tables 1 to 5 show a manner in which the foregoing various information including the operation support information are stored in the database 33.

First, a part file specified by a part identifying data (refereed to hereinafter as "part ID") such as the part number for specifying a part is provided. As shown in Table 1, the part file has a file for shape, a file for set-up operation and a file for bending operation. The file for the shape stores data for the shape as shown in FIGS. 5 and 6A.

TABLE 1

| Part ID |  |
| Part File |  |
| --- | --- |
| File for Shape | FIGS. 5 and 6A |
| File for Set-up Operation | Table 2 |
| File for Bending Operation | Table 5 |

The file for the set-up operation has a file for the bending order, a file for the tools, a file for the tool layout, a file for the alignment of the tools and a file for the original-point determination operation, as shown in Table 2. Here, the file for the bending order stores bending order data shown in FIG. 6B or Table 3, the file for the die stores data of the tool or die shown in FIG. 6B or Table 4, the file for the tool or die layout stores data for the layout of the die shown in FIG. 7A and FIG. 7B, the file for the alignment of tools stores data for the tools shown in FIG. 8 and the message 4 therein, and the file for the original-point determination operation stores data for FIG. 8 and the message 5 therein.

TABLE 2

File for Set-up Operation

| | |
|---|---|
| File for Bending Order | FIG. 6B, Table 3 |
| File for Tools | Table 4 |
| File for Tool Layout | FIG. 7A, FIG. 7B |
| File for Tool Alignment | FIG. 8 and Message 4 |
| File for Original-Point Determination Operation | FIG. 8 and Message 5 |

TABLE 3

A Portion of File for Bending Order

| Bending Line | Bending Order |
|---|---|
| B1 | 3 |
| B2 | 2 |
| B3 | 1 |

TABLE 4

File for Tools

| Bending Line Number | Punch Number Die Number | Punch Length Die Length |
|---|---|---|
| B1 | P2 = 14702 | 50 |
| | D2 = 30286(10) | 50 |
| B2 | P1 = 402 | 835 |
| | D1 = 30286(11) | 835 |
| B3 | P1 = 402 | 835 |
| | D1 = 30286(11) | 835 |

The file for the bending operation stores bending operation data as shown in Table 5. That is, data for symbols and figures as shown in FIG. 9A and FIG. 9B (or FIG. 9C) and data of D1, L1 and Yz1 for the D, L and Yz as shown in FIG. 14 are stored in relation to the bending line number B1. In relation to the bending line number B2, data for symbols and figures as shown in FIG. 10A and FIG. 10B (or FIG. 10C) and data of D2, L2 and Yz2 for the D, L and Yz are stored. In relation to the bending line number B3, data for the symbols and figures as shown in FIG. 11A and FIG. 11B (or FIG. 11C) and data of D3, L3 and Yz3 for the D, L and Yz are stored.

TABLE 5

File for Bending Operation

| Bending Line Number | Bending Operation Support Information | Data for D, L, Yz |
|---|---|---|
| B1 | FIGS. 9A and 9B (or FIG. 9C) | D = D1<br>L = L1<br>Yz = Yz1 |
| B2 | FIGS. 10A and 10B (or FIG. 10C) | D = D2<br>L = L2<br>Yz = Yz2 |
| B3 | FIGS. 11A and 11B (or FIG. 11C) | D = D3<br>L = L3<br>Yz = Yz3 |

A method of manufacturing parts by using data for bending operation stored in the database 33 will now be described with reference to FIG. 2 and FIGS. 12A and 12B. Hereinafter this operation is called a repeat/similar bending operation or a same part/similar part bending operation.

Figure 12A:
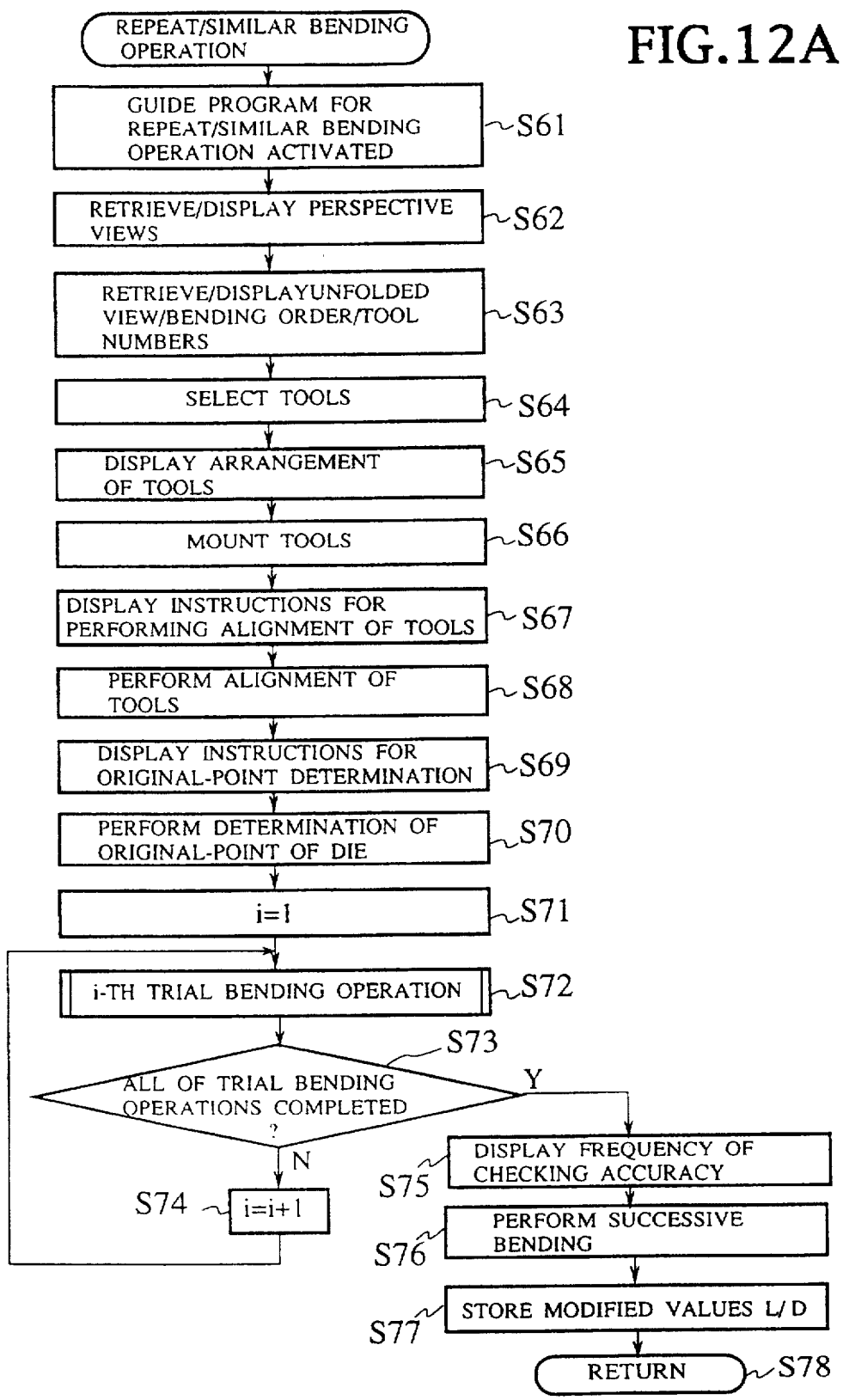
FIG. 12A is a flow chart showing a detailed operation of a portion of the operation shown in the flow chart of FIG. 2, and specifically the flow chart showing the operation when the same or a similar part is manufactured in FIG. 2.

Note that FIG. 12A is a detailed flow chart of step S13 shown in FIG. 2, and FIG. 12B is a detailed flow chart of step S72 shown in FIG. 12A. The repeat/similar bending operation is supposed to be performed at the second bending station 22 in FIG. 1.

Referring again to FIG. 2, in step S10, an operator at the second bending station 22 reads the bar code attached to an operation instruction sheet by using the bar code scanner 27a. Then, bending operation data for manufacturing a ordered part, which is the same as or similar to the part stored in the database 33 of the server 31, is retrieved to the terminal 27.

In step S11, if it is determined that the ordered part is not a new part (that is, if the database 33 includes bending operation data for one or more parts that are the same as or similar to the ordered part), the operation proceeds to step S61 in FIG. 12A. In step S61, a guide program for guiding the operator in performing the repeat/similar bending operation is activated.

In step S62, a perspective view of the ordered part and that of a part that is the same as or similar to the ordered part are retrieved and displayed on the CRT screen 27b as shown in FIG. 5; here, a statement that the ordered part is the same as or similar to the part or parts data of which have been stored in the database 33 is simultaneously displayed on the CRT screen 27b (not shown). When bending data for a similar part is used to manufacture the ordered part, the shape of the ordered part and the shape of the similar part are also simultaneously displayed on the CRT screen 27b. Here, in the following, it is supposed that the shapes of the ordered part and of the similar part differs from each other slightly, for example, in width of the flange W2 as shown in FIG. 5. Then, the operator observes the perspective views of the parts to confirm the shape of the part to manufacture.

In step S63, the operator depresses an suitable key on the keyboard 27c so that data for unfolded views of the ordered part (and that of the similar part), data for the bending order for manufacturing the part and data for the tool numbers to be used are retrieved and displayed on the screen, as shown in FIGS. 6A and 6B. Thus, the operator can easily confirm the unfolded views of the parts, the bending order and the die to be used.

In step S64, the operator selects necessary tools (i.e. punches and dies) P1, D1, P2 or D2 from an suitable die magazine by referring to the tools displayed on the screen 27b.

In step S65, the operator again depresses an suitable key on the keyboard 27c so that the layout (arrangement) of the tools on the second bending press 23 and hints for arranging the tools are displayed on the screen as operation support information, as shown in FIG. 7A and FIG. 7B.

In step S66, the operator places or mounts selected tools on the bending press 23 by referring to the tool arrangement displayed on the CRT screen 27b in step S65.

In step S67, the operator depresses an suitable key on the keyboard so that the cross sectional shape of the tools, the instructions (not shown) for performing the alignment of the tools and the hints or operation support information relating to the alignment of the tools (such as the message 4) are displayed on the screen 27b, as shown in FIG. 8.

In step S68, the operator aligns the tools on the bending press 23 by referring to the figures and statements displayed on the screen 27b.

In step S69, the operator again depresses an suitable key on the keyboard 25c so that the cross sectional view of the tools, the instruction (not shown) for determining the original point of the die and hints for performing original-point determination (such as the message 5) are displayed on the screen, as shown in FIG. 8.

In step S70, the operator performs the determination of the original-point of the die in the bending press 23 while referring to information displayed on the screen 27b in step S69.

When the original-point determination operation is completed, the process proceeds to step S71, where the bending operation number i is set to 1.

In step S72, the operator performs an i-th trial bending operation in a workpiece referring to operation support information for the i-th trial bending operation displayed on the screen of the CRT 27b.

In step S73, it is determined whether all of the trial bending operations have been completed. If all of the trial bending operations have not been completed, the bending operation number i is increased by one at step S74, and the process returns to step S72.

If all of the trial bending operations have been completed in step S73, the operation proceeds to step S75.

In step S75, the frequency for checking the accuracy of the bending operations carried out during successive bending operation performed in step s76 is displayed on the screen. For example, an instruction to check the accuracy for every 10 workpieces is displayed on the screen of the CRT 27b.

In step S76, the operator successively bends a plurality of workpieces in accordance with the trial bending operations performed in step S72 so as to manufacture the plurality of the ordered parts. During this operation, the operator follows the instructions displayed in step S75 to check the bending accuracy each time 10 parts are processed. If the processing accuracy does not satisfy a predetermined tolerance, the value L and value D are modified.

In step S77, the value L and the value D modified in step S76 are stored in the database 33 through the terminal 27. In step S78, the repeat/similar being process is completed.

FIG. 12B is a flow chart showing details of the i-th trial bending operation performed in step S72 shown in FIG. 12A.

When the operator sets the bending operation number i to 1 in step S71, the process proceeds to step S80, where information for positioning the workpiece W relative to the tools P1 and D1 and the hints relating to the operation for locating the workpiece are displayed as operation support information on the screen of the CRT 27b, as shown in FIG. 9A.

In step S81, the operator locates the workpiece W with respect to the punch P1 and the die D1 by referring to the display on the screen. Moreover, the workpiece W is located so that the bending line B3 of the workpiece W is positioned between the punch P1 and the die D2. Here, the position of the back gauge device 55 is located to a predetermined height in the rear of the punch P1 and the die D1 in accordance with the data of L and Yz retrieved from the database 33.

When the ordered part has a shape similar to that of the part retrieved from the database 33, the position of the back gauge device 55 in the longitudinal direction (that is, the value of L) is somewhat modified in step S81 in accordance with the actual width of the flange W2 of the ordered part (as described above, it is supposed here that the length of the flange W2 of the ordered part is somewhat different from the length of the flange W2 of the similar part stored in the database 33).

In step S82, the operator executes the ith trial bending operation on the workpiece W along the bending line B3.

After the bending operation has been completed, in step S83, the shape of the workpiece formed with the flange W2 as well as the figures (and instructions) relating to the dimension L1 and angle θ 1 to be measured for inspection of the bending accuracy are displayed on the screen of the CRT 27b, as shown in FIG. 9B or 9C.

In step S84, the operator inspects or measures the dimension L1 and the angle θ 1 of the workpiece by referring to the dimension and the angle displayed on the screen.

In step S85, it is determined whether the dimension L1 and the angle θ 1 are within a predetermined tolerance. If the predetermined tolerance is not satisfied, the value D and the value L are modified in step S86 and in step S87, the i-th trial bending operation is completed.

In the second trial bending operation where i=2, the figures and symbols shown in FIG. 10A are displayed in step S80, and in step S83, figures and symbols shown in FIG. 10B or FIG. 10C are displayed.

Likewise, in the third bending operation where i=3, figures and symbols shown in FIG. 11A are displayed in step S80, and in step S83, figures and symbols shown in FIG. 11B or FIG. 11C are displayed.

As described above, in the repeat/similar bending operation according to this embodiment, variety of data including operation support information stored for manufacturing one of more parts that are the same as or similar to the ordered part are retrieved from the data base; then the bending operation is performed on the basis of the retrieved data. Therefore, an operator without skill at bending operation can completely use the operation information stored by a skilled operator. As a result, even the non-skilled operator can easily and quickly perform a precise bending operation.

What is claimed is:

1. A method of generating data for manufacturing a part by bending a workpiece along a plurality of bending lines with a bending press that has detachable tools, said method comprising:

storing data for a shape of said part;

storing data indicating an order of bending operations in which the workpiece is bent along the bending lines;

selecting tools for performing each of the bending operations along the bending lines;

storing data for selected tools;

storing bending press control data for controlling the operation of said bending press to perform the bending operations in said bending order; and storing bending operation support information for supporting an operator for performing the bending operations by using said bending press, said storing of said bending operation support information comprising storing support information regarding the operation of at least one of the following:

attaching a protective tape on a shoulder of a die;

arranging small tools on said bending press so that a punch and a die are laterally shifted from each other;

attaching a small die on a ram with a fixing tape;

aligning a punch and a die relative to each other in a longitudinal direction;

determining an original point of a punch or a die relative to the other;

positioning the workpiece relative to a punch and a die;

positioning the workpiece relative to a backgauge device; and inspecting dimensions of a shape of the workpiece after performing a bending operation.

2. A method for generating data for manufacturing a part according to claim 1, said method further comprising per-

19 forming an alignment of tools in a longitudinal direction of said bending press before performing the bending operations, and storing support information regarding an execution of the alignment of tools in the longitudinal direction.

3. A method for generating data for manufacturing a part according to claim 1, said method further comprising performing an original-point adjustment operation to adjust an original point of a die with respect to a punch, and storing support information regarding an execution of the original-point adjustment operation.

4. A method for generating data for manufacturing a part according to claim 1, said method further comprising performing a trial bending operation for each of the bending operations to be performed on the workpiece, and storing support information regarding a frequency of checking an accuracy of dimensions of the workpiece.

5. A method for generating data for manufacturing a part according to claim 1, said method further comprising performing an original-point adjustment operation to determine an original point of a die with respect to a punch, and storing control data D, L and Yz for performing the bending operations with said bending press, wherein D specifies a vertical position of the die relative to the original point of the die, L specifies a position of a backgauge device in a lateral direction relative to a central position of the die, and Yz specifies a vertical position of the backgauge device relative to a top end position of the die.

6. A method of manufacturing a part by bending a workpiece along a plurality of bending lines with a bending press that has a detachable tool, said method comprising:

storing data for a shape of said part;

storing data indicating a bending order for manufacturing said part from said workpiece;

selecting tools for performing each of the bending operations in said bending order;

storing data for specifying the selected tools;

mounting said selected tools on said bending press;

storing bending press control data for controlling the operation of said bending press for performing each of the bending operations;

bending said workpiece in said bending order in accordance with the bending press control data for each of the bending operations; and storing bending operation support information for supporting an operator for performing the bending operations, said storing of said bending operation support information comprising storing support information regarding operation of at least one of the following:

attaching a protective tape on a shoulder of a die;

arranging small tools on said bending press so that a punch and a die are laterally shifted from each other;

attaching a small die on a ram with a fixing tape;

aligning a punch and a die relative to each other in a longitudinal direction;

determining an original point of a punch or a die relative to the other;

positioning the workpiece relative to a punch and a die;

positioning the workpiece relative to a backgauge device; and checking a dimension of a shape of the workpiece after performing a bending operation.

7. A method of manufacturing a part according to claim 6, said method further comprising:

determining a bending order and tools for use to manufacture said part in accordance with a shape of said part;

20 storing the determined bending order and the tools in a computer memory;

selecting the determined tools from a tool storage;

determining an arrangement of the tools on said bending press;

storing the determined arrangement of said tools in the computer memory;

mounting said tools on said bending press in accordance with said determined arrangement;

determining an attitude of the workpiece to be fed into said bending press at each bending step;

storing the determined attitude of the workpiece for each said bending step; and feeding the workpiece into said bending press with said attitude for each said bending step and bending the workpiece along the bending lines with said bending press.

8. A method for manufacturing a part according to claim 6, said method further comprising performing an alignment of tools in a longitudinal direction of said bending press before performing the bending operations, and storing support information regarding an execution of the alignment of tools in the longitudinal direction.

9. A method for manufacturing a part according to claim 6, said method further comprising performing an original-point adjustment operation to adjust an original point of a die with respect to a punch, and storing support information regarding an execution of the original-point adjustment operation.

10. A method for manufacturing a part according to claim 6, said method further comprising performing a trial bending operation for each of the bending operations to be performed on the workpiece, and storing support information regarding a frequency of checking an accuracy of dimensions of the workpiece.

11. A method for manufacturing a part according to claim 6, said method further comprising performing an original-point adjustment operation to determine an original point of a die with respect to a punch, and storing control data D, L and Yz for performing the bending operations with said bending press, wherein D specifies a vertical position of the die relative to the original point of the die, L specifies a position of a backgauge device in a lateral direction relative to a central position of the die, and Yz specifies a vertical position of the backgauge device relative to a top end position of the die.

12. A system for generating data for manufacturing a part by bending a workpiece along a plurality of bending lines with a bending press that has detachable tools, said system comprising:

a section that stores data for a shape of said part;

a section that stores data indicating a bending order for manufacturing said part from said workpiece;

a section that stores data for specifying the selected dies for each bending operation;

a section that stores bending press control data for controlling the operation of said bending press to perform the bending operations in said bending order; and a section that stores bending operation support information for supporting an operator to perform the bending operations by using said bending press, said storing of said bending operation support information comprising storing support information regarding the operation of at least one of the following:

attaching a protective tape on a shoulder of a die;

arranging small tools on said bending press so that a punch and a die are laterally shifted from each other;

attaching a small die on a ram with a fixing tape;

aligning a punch and a die relative to each other in a longitudinal direction;

determining an original point of a punch or a die relative to the other;

positioning the workpiece relative to a punch and a die;

positioning the workpiece relative to a backgauge device; and checking a dimension of a shape of the workpiece after performing a bending operation.

13. A system for generating data for manufacturing a part according to claim 12, said system further comprising:

a server provided with a database for storing various data relating bending operations for manufacturing a part and with a bar code generating device for generating a bar code in relation to the part to be produced by the bending press; and a terminal computer for controlling the bending press, the terminal computer being connected to said server for data communication and being provided with a bar code reading device for reading a bar code and retrieving data concerning the part from said database.

14. A system for generating data for manufacturing a part according to claim 12, said system method further comprising a section that stores support information regarding an execution of an original-point adjustment operation that is performed to adjust an original point of a die with respect to a punch.

15. A system for generating data for manufacturing a part according to claim 12, said system further comprising a section that stores support information regarding a frequency of checking an accuracy of dimensions of the workpiece.

16. A system for generating data for manufacturing a part according to claim 12, said system further comprising a section that stores control data D, L and Yz for performing the bending operations with said bending press, wherein D specifies a vertical position of the die relative to an original point of a die, L specifies a position of a backgauge device in a lateral direction relative to a central position of the die, and Yz specifies a vertical position of the backgauge device relative to a top end position of the die.

17. A method for generating data for manufacturing a part by bending a workpiece with a bending press, said method comprising:

storing data that specifies a shape of said part;

storing data indicating an order of performing bending operations on the workpiece with said bending press;

storing data that specifies tools for performing each of the bending operations, said tools comprising a punch and a die;

performing an original-point adjustment operation to adjust an original point of the die with respect to the punch, and storing bending operation support information regarding an execution of the original-point adjustment operation; and performing a trial bending operation for each of the bending operations to be performed on the workpiece, and storing bending operation support information regarding a frequency of checking an accuracy of dimensions of the workpiece.

18. A method for manufacturing a part according to claim 17, said method further comprising storing control data D, L and Yz for performing the bending operations with said bending press, wherein D specifies a vertical position of the die relative to the original point of the die, L specifies a position of a backgauge device in a lateral direction relative to a central position of the die, and Yz specifies a vertical position of the backgauge device relative to a top end position of the die.

19. A method for manufacturing a part according to claim 18, said method further comprising storing bending operation support information that specifies dimensions of the workpiece to be checked for accuracy, and modifying the control data D and L, during a trial bending operation, when the dimensions of the workpiece are checked and determined not to be within a predetermined tolerance.

20. A method for generating data for manufacturing a part by bending a workpiece with a bending press, said method comprising:

storing data that specifies a shape of said part;

storing data indicating an order of performing bending operations on the workpiece with said bending press;

storing data that specifies tools for performing each of the bending operations, said tools comprising a punch and a die;

determining an arrangement of said tools on said bending press;

mounting said tools on said bending press in accordance with said determined arrangement;

performing an original-point adjustment operation to adjust an original point of the die with respect to the punch, and storing bending operation support information regarding an execution of the original-point adjustment operation;

performing a trial bending operation for each of the bending operations to be performed on the workpiece; and storing control data D, L and Yz for performing the bending operations with said bending press, wherein D specifies a vertical position of the die relative to the original point of the die, L specifies a position of a backgauge device in a lateral direction relative to a central position of the die, and Yz specifies a vertical position of the backgauge device relative to a top end position of the die.

21. A method for manufacturing a part according to claim 20, said method further comprising storing bending operation support information regarding a frequency of checking an accuracy of dimensions of the workpiece, storing bending operation support information that specifies dimensions of the workpiece to be checked for accuracy, and modifying the control data D and L, during a trial bending operation, when the dimensions of the workpiece are checked and determined not to be within a predetermined tolerance.

* * * * *

UNITED STATES PATENT AND TRADEMARK OFFICE
CERTIFICATE OF CORRECTION

PATENT NO. : 5,799,530
DATED : September 1, 1998
INVENTOR(S) : T. NAGASAWA

It is certified that error appears in the above-identified patent and that said Letters Patent is hereby corrected as shown below:

Item [57] Abstract, should read as follows:

—A method and system are provided that enable an operator without skills in performing bending operations to easily and quickly perform precise bending operations on a sheet workpiece by following a skilled operator's experience, hints or data. The method may include: storing data for a shape of a part; storing data related to a bending order for manufacturing the part from a workpiece; selecting tools for performing each bending operation; storing data for the selected tools or dies; storing bending press control data for controlling the operation of the bending press to perform the bending operations in accordance with the bending order; and storing bending operation support information for supporting an operator for performing the bending operations by using the bending press. The bending operation support information may include hints or information regarding at least one of the following operations; attaching a protective tape on the shoulder of a die; arranging small tools on the bending press so that a punch and die are laterally shifted from each other; attaching a small die on a ram with a fixing tape; aligning a punch and die relative to each other in a longitudinal direction; determining an original point of one of the punch and die relative to each other; positioning a workpiece relative to a punch and die; positioning a workpiece relative to a backgauge device; and checking a dimension of a shape

UNITED STATES PATENT AND TRADEMARK OFFICE
CERTIFICATE OF CORRECTION

PATENT NO. : 5,799,530
DATED : September 1, 1998
INVENTOR(S) : T. NAGASAWA

It is certified that error appears in the above-identified patent and that said Letters Patent is hereby corrected as shown below:

of the workpiece after performing a bending operation.--

Signed and Sealed this

Twenty-first Day of March, 2000

Attest:

Q. TODD DICKINSON

Attesting Officer

Commissioner of Patents and Trademarks